(12) United States Patent
Fleck et al.

(10) Patent No.: US 10,848,571 B2
(45) Date of Patent: Nov. 24, 2020

(54) SYSTEMS AND METHODS FOR CONSISTENT ENFORCEMENT POLICY ACROSS DIFFERENT SAAS APPLICATIONS VIA EMBEDDED BROWSER

(71) Applicant: Citrix Systems, Inc., Fort Lauderdale, FL (US)

(72) Inventors: Christopher Fleck, Fort Lauderdale, FL (US); Jeroen Mattijs van Rotterdam, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 117 days.

(21) Appl. No.: 16/139,800

(22) Filed: Sep. 24, 2018

(65) Prior Publication Data

US 2020/0099753 A1 Mar. 26, 2020

(51) Int. Cl.
*G06F 15/16* (2006.01)
*H04L 29/08* (2006.01)

(52) U.S. Cl.
CPC ............ *H04L 67/143* (2013.01); *H04L 67/22* (2013.01); *H04L 67/24* (2013.01)

(58) Field of Classification Search
CPC ........ H04L 67/143; H04L 67/24; H04L 67/22
USPC ........ 709/218, 227, 228, 229, 206; 715/745, 715/780.765; 726/22, 4
See application file for complete search history.

(56) References Cited

U.S. PATENT DOCUMENTS

| | | | |
|---|---|---|---|
| 6,981,048 B1* | 12/2005 | Abdolbaghian | H04L 67/14 709/203 |
| 7,093,020 B1* | 8/2006 | McCarty | H04L 67/14 709/229 |
| 2006/0059556 A1* | 3/2006 | Royer | G06F 9/485 726/22 |
| 2008/0028026 A1* | 1/2008 | Chen | G06Q 10/107 709/206 |
| 2012/0226813 A1* | 9/2012 | Ragusa | G06F 9/5027 709/227 |
| 2016/0381000 A1* | 12/2016 | Mathew | H04L 63/0815 726/4 |

OTHER PUBLICATIONS

International Search Report and Written Opinion for International Appl. No. PCT/US2019/052346, dated Nov. 28, 2019.

* cited by examiner

*Primary Examiner* — Thuong Nguyen
(74) *Attorney, Agent, or Firm* — Foley & Lardner LLP

(57) ABSTRACT

Embodiments described include systems and methods for managing sessions to one or more network applications accessed via a client application including an embedded browser. The client application establishes sessions to one or more network applications. The client application identifies a session timeout policy for managing the sessions of the client application. The session timeout policy specifies a time period for which a session is determined to be inactive. The client application monitors activity in the embedded browser for each of the sessions. The client application detects that inactivity of a first session of the sessions has reached the time period of the session timeout policy. The client application detects the inactivity responsive to the monitoring. The client application terminates each of the sessions via the embedded browser responsive to the detection.

20 Claims, 12 Drawing Sheets

SYSTEMS AND METHODS FOR CONSISTENT ENFORCEMENT POLICY ACROSS DIFFERENT SAAS APPLICATIONS VIA EMBEDDED BROWSER

FIELD OF THE DISCLOSURE

The present application generally relates to management of applications, including but not limited to systems and methods for using an embedded browser to manage and monitor web and software-as-a-service (SaaS) applications.

BACKGROUND

As the workforce of an enterprise becomes more mobile and work under various conditions, an individual can use one or more client devices, including personal devices, to access network resources such as web applications. Due to differences between the client devices and the manner in which network resources can be accessed, there are significant challenges to the enterprise in managing access to network resources and monitoring for potential misuse of resources.

BRIEF SUMMARY

The present disclosure is directed towards systems and methods for applying a consistent enforcement policy across different software-as-a-service (SaaS) applications via an embedded browser. A client application executing on a client device can allow a user to access applications (apps) that are served from and/or hosted on one or more servers, such as web applications and SaaS applications (hereafter sometimes generally referred to as network applications). A browser that is embedded or integrated with the client application can render to the user a network application that is accessed or requested via the client application, and can enable interactivity between the user and the network application. The browser is sometimes referred to as an embedded browser, and the client application with embedded browser (CEB) is sometimes referred to as a workspace application. The client application can establish a secure connection to the one or more servers to provide an application session for the user to access the network application using the client device and the embedded browser. The embedded browser can be integrated with the client application to ensure that traffic related to the network application is routed through and/or processed in the client application, which can provide the client application with real-time visibility to the traffic (e.g., when decrypted through the client application), and user interactions and behavior. The embedded browser can provide a seamless experience to a user as the network application is requested via the user interface (shared by the client application and the embedded browser) and rendered through the embedded browser within the same user interface. By using the embedded browser, the present disclosure can apply a consistent enforcement policy across different SaaS apps accessed via the client device executing the with embedded browser. For example, SaaS apps or services can have a variety of session timeout policies, or no timeout policy. The present disclosure can set, configure, provide or otherwise apply a single policy, or a per app policy that applies to all web or SaaS apps launched from the CEB.

The client application can monitor keyboard activity during usage of each CEB session. When the time limit set by the administrator is reached, the client application can execute a command to kill the CEB app for all CEB sessions. Further, the systems and methods of the present disclosure can allow a policy to keep sessions launched in the CEB to be kept alive as long as there is any activity in any of the CEB sessions. The activity monitor for each CEB session can report actual keyboard activity to the primary CEB app. Each CEB session can include a process to simulate keyboard activity. The simulated keyboard activity can include, for example, a blank space and enter then backspace or other keyboard activity that reports activity to the SaaS system but does not alter the desired user input into the CEB app or CEB session. The client application can execute the keyboard simulation in each idle CEB session when there is actual keyboard activity in any CEB session. However, when there is no actual keyboard activity in any session, the keyboard simulation will not be run. Thus, the client application can facilitate timing out all sessions according to the policy set by the CEB administrator.

In one aspect, this disclosure is directed to a method for managing sessions to one or more network applications accessed via a client application including an embedded browser. The client application can be on a client device. The client application can establish sessions to one or more network applications. Each of the sessions can be accessed via an embedded browser of the client application. The client application can identify a session timeout policy for managing the sessions of the client application. The session timeout policy specifies a time period for which a session is determined to be inactive. The client application can monitor activity in the embedded browser for each of the session. The client application can detect that inactivity of a first session of the sessions has reached the time period of the session timeout policy. The client application can detect the inactivity responsive to the monitoring. The client application can terminate each of the sessions via the embedded browser responsive to the detection.

In some embodiments, the embedded browser can be integrated into the client application. In some embodiments, the one or more network applications can include an application hosted on a server accessed by the client device via a network.

In some embodiments, the client application can establish one or more activity monitors for monitoring each session of the plurality of sessions. In some embodiments, the one or more activity monitors can monitor keyboard activity in each of the sessions.

In some embodiments, the client application can establish one or more activity simulators for simulating activity in each of the sessions. In some embodiments, the client application can execute the one or more activity simulators for each idle session of the sessions if any one of the sessions has activity. In some embodiments, the client application cannot execute the one or more activity simulators for any of the sessions if all of the plurality of sessions are idle.

In some embodiments, the client application can execute a command to terminate the client application.

In another aspect, this disclosure is directed to a system for managing sessions to one or more network applications accessed via a client application including an embedded browser. The system can include a client application executable on one or more processors of a client device. The client application can include an embedded browser. The system can include one or more activity monitors. The client application can include the one or more activity monitors. The client application can establish sessions to one or more network applications accessed via the embedded browser. The client application can identify a session timeout policy for managing the sessions of the client application. The session timeout policy can specify a time period for which a session is determined to be inactive. The one or more activity monitors can monitor activity in the embedded browser for each of the sessions. The one or more activity monitors can detect that inactivity of a first session of the plurality of session has reached the time period of the session timeout policy. The client application can terminate each of the plurality of sessions accessed via the embedded browser responsive to the detection.

In some embodiments, the embedded browser can be integrated with the client application. In some embodiments, the one or more network applications can include an application hosted on a server accessed by the client device via a network.

In some embodiments, the one or more activity monitors can be configured to monitor keyboard activity of the sessions. In some embodiments, the client application can be configured to execute a command to terminate one of the client application, the embedded browser or each of the sessions.

In another aspect, this disclosure is directed to a system for keeping active sessions to one or more networked applications accessed via a client application including an embedded browser. The system can include a client application executable on one or more processors of a client device. The client application can include an embedded browser. The system can include one or more activity monitors. The system can include one or more activity simulators. The client application can establish sessions to one or more network applications accessed via the embedded browser. The client application can identify a session timeout policy for managing the sessions of the client application. The session timeout policy can specify a time period for which a session is determined to be inactive. The one or more activity monitors can monitor activity in the embedded browser for each of the sessions. The one or more activity simulators can simulate activity in one or more of the sessions responsive to the one more activity monitors detecting that the one or more sessions are idle and that the time period of the session timeout policy has not been reached for any of the plurality of sessions.

In some embodiments, the embedded browser can be integrated with the client application. In some embodiments, the one or more network applications include an application hosted on a server accessed by the client device via a network.

In some embodiments, the one or more activity monitors can monitor keyboard activity of the sessions. In some embodiments, an activity simulator of the one or more activity simulators can execute for each idle session of the sessions if the one or more activity monitors has detected that any one of the sessions has activity.

In some embodiment, the client application can be configured not to execute the one or more activity simulators responsive to the one or more activity monitors detecting that all of the plurality of sessions are idle.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 6 is an example representation of an implementation for browser redirection using a secure browser plug-in;

Figure 1:
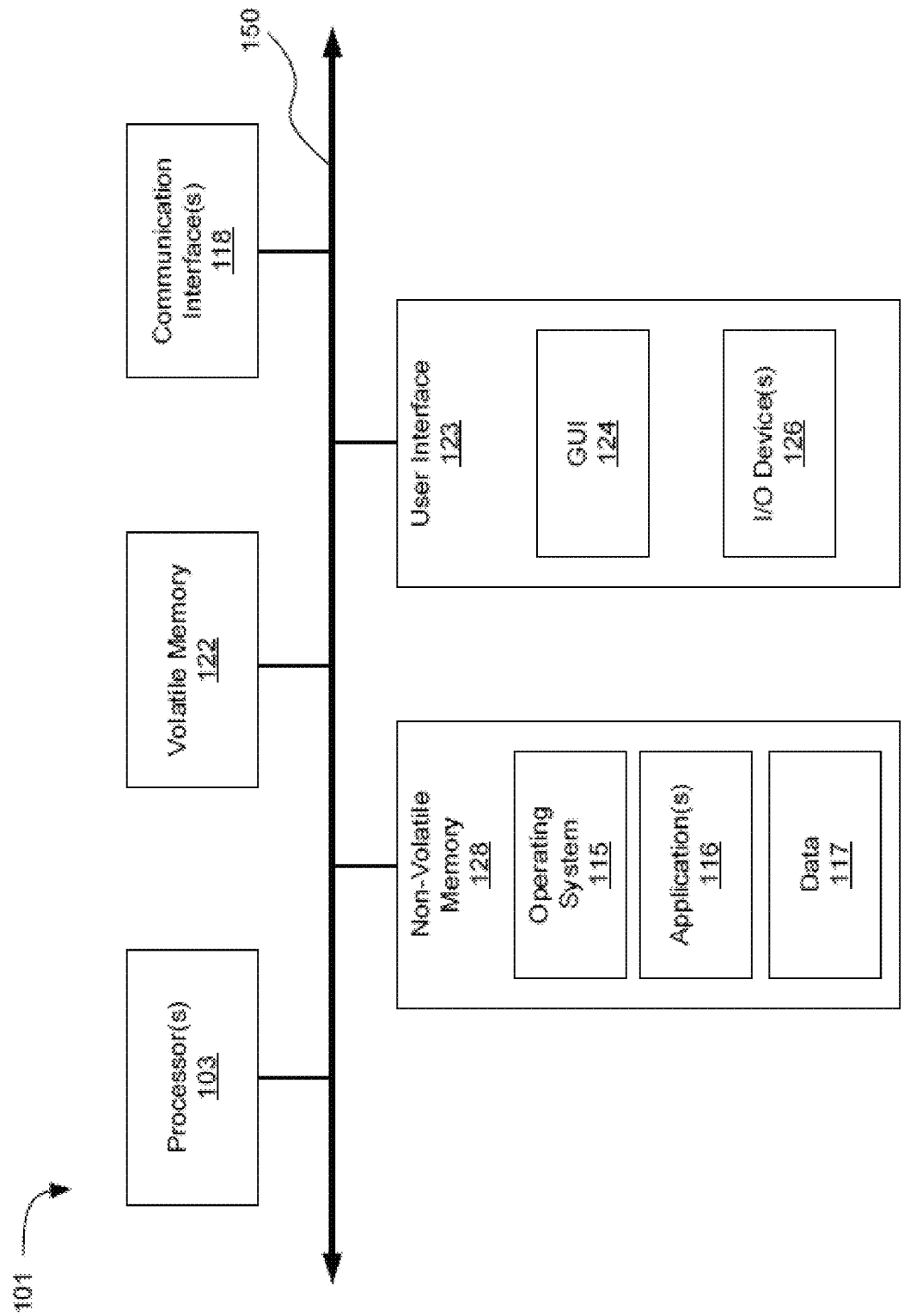
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents can be helpful:

Section A describes a computing environment which can be useful for practicing embodiments described herein.

Section B describes systems and methods for an embedded browser.

Section C describes systems and methods for managing sessions to network applications accessed via a client application including an embedded browser.

A. Computing Environment

Prior to discussing the specifics of embodiments of the systems and methods detailed herein in Sections B and C, it can be helpful to discuss the computing environments in which such embodiments can be deployed.

As shown in FIG. 1, computer 101 can include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 can include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 can include one or more types of RAM and/or a cache memory that can offer a faster response time than a main memory. Data can be entered using an input device of GUI 124 or received from I/O device(s) 126. Various elements of computer 101 can communicate via one or more communication buses, shown as communication bus 150.

Computer 101 as shown in FIG. 1 is shown merely as an example, as clients, servers, intermediary and other networking devices and can be implemented by any computing or processing environment and with any type of machine or set of machines that can have suitable hardware and/or software capable of operating as described herein. Processor(s) 103 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A "processor" can perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" can be analog, digital or mixed-signal. In some embodiments, the "processor" can be one or more physical processors or one or more "virtual" (e.g., remotely located or "cloud") processors. A processor including multiple processor cores and/or multiple processors multiple processors can provide functionality for parallel, simultaneous execution of instructions or for parallel, simultaneous execution of one instruction on more than one piece of data.

Communications interfaces 118 can include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 can execute an application on behalf of a user of a client computing device. For example, the computing device 101 can execute a virtual machine, which provides an execution session within which applications execute on behalf of a user or a client computing device, such as a hosted desktop session. The computing device 101 can also execute a terminal services session to provide a hosted desktop environment. The computing device 101 can provide access to a computing environment including one or more of: one or more applications, one or more desktop applications, and one or more desktop sessions in which one or more applications can execute.

Additional details of the implementation and operation of network environment, computer 101 and client and server computers can be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for an Embedded Browser

The present disclosure is directed towards systems and methods of an embedded browser. A client application executing on a client device can allow a user to access applications (apps) that are served from and/or hosted on one or more servers, such as web applications and software-as-a-service (SaaS) applications (hereafter sometimes generally referred to as network applications). A browser that is embedded or integrated with the client application can render to the user a network application that is accessed or requested via the client application, and can enable interactivity between the user and the network application. The browser is sometimes referred to as an embedded browser, and the client application with embedded browser (CEB) is sometimes referred to as a workspace application. The client application can establish a secure connection to the one or more servers to provide an application session for the user to access the network application using the client device and the embedded browser. The embedded browser can be integrated with the client application to ensure that traffic related to the network application is routed through and/or processed in the client application, which can provide the client application with real-time visibility to the traffic (e.g., when decrypted through the client application), and user interactions and behavior. The embedded browser can provide a seamless experience to a user as the network application is requested via the user interface (shared by the client application and the embedded browser) and rendered through the embedded browser within the same user interface.

The client application can terminate one end of a secured connection established with a server of a network application, such as a secure sockets layer (SSL) virtual private network (VPN) connection. The client application can receive encrypted traffic from the network application, and can decrypt the traffic before further processing (e.g., rendering by the embedded browser). The client application can monitor the received traffic (e.g., in encrypted packet form), and also have full visibility into the decrypted data stream and/or the SSL stack. This visibility can allow the client application to perform or facilitate policy-based management (e.g., including data loss prevention (DLP) capabilities), application control (e.g., to improve performance, service level), and collection and production of analytics. For instance, the local CEB can provide an information technology (IT) administrator with a controlled system for deploying web and SaaS applications through the CEB, and allow the IT administrator to set policies or configurations via the CEB for performing any of the forgoing activities.

Many web and SaaS delivered applications connect from web servers to generic browsers (e.g., Internet Explorer, Firefox, and so on) of users. Once authenticated, the entire session of such a network application is encrypted. However, in this scenario, an administrator may not have visibility, analytics, or control of the content entering the network application from the user's digital workspace, or the content leaving the network application and entering the user's digital workspace. Moreover, content of a network application viewed in a generic browser can be copied or downloaded (e.g., by a user or program) to potentially any arbitrary application or device, resulting in a possible breach in data security.

This present systems and methods can ensure that traffic associated with a network application is channeled through a CEB. By way of illustration, when a user accesses a SaaS web service with security assertion markup language (SAML) enabled for instance, the corresponding access request can be forwarded to a designated gateway service that determines, checks or verifies if the CEB was used to make the access request. Responsive to determining that a CEB was used to make the access request, the gateway service can perform or provide authentication and single-sign-on (SSO), and can allow the CEB to connect directly to the SaaS web service. Encryption (e.g., standard encryption) can be used for the application session between the CEB and the SaaS web service. When the content from the web service is unencrypted in the CEB to the viewed via the embedded browser, and/or when input is entered via the CEB, the CEB can provide added services on selective application-related information for control and analytics for instance. For example, an analytics agent or application programming interface (API) can be embedded in the CEB to provide or perform the added services.

The CEB (sometimes referred to as workspace application or receiver) can interoperate with one or more gateway services, intermediaries and/or network servers (sometimes collectively referred to as cloud services or Citrix Cloud) to provide access to a network application. Features and elements of an environment related to the operation of an embodiment of cloud services are described below.

Figure 2:
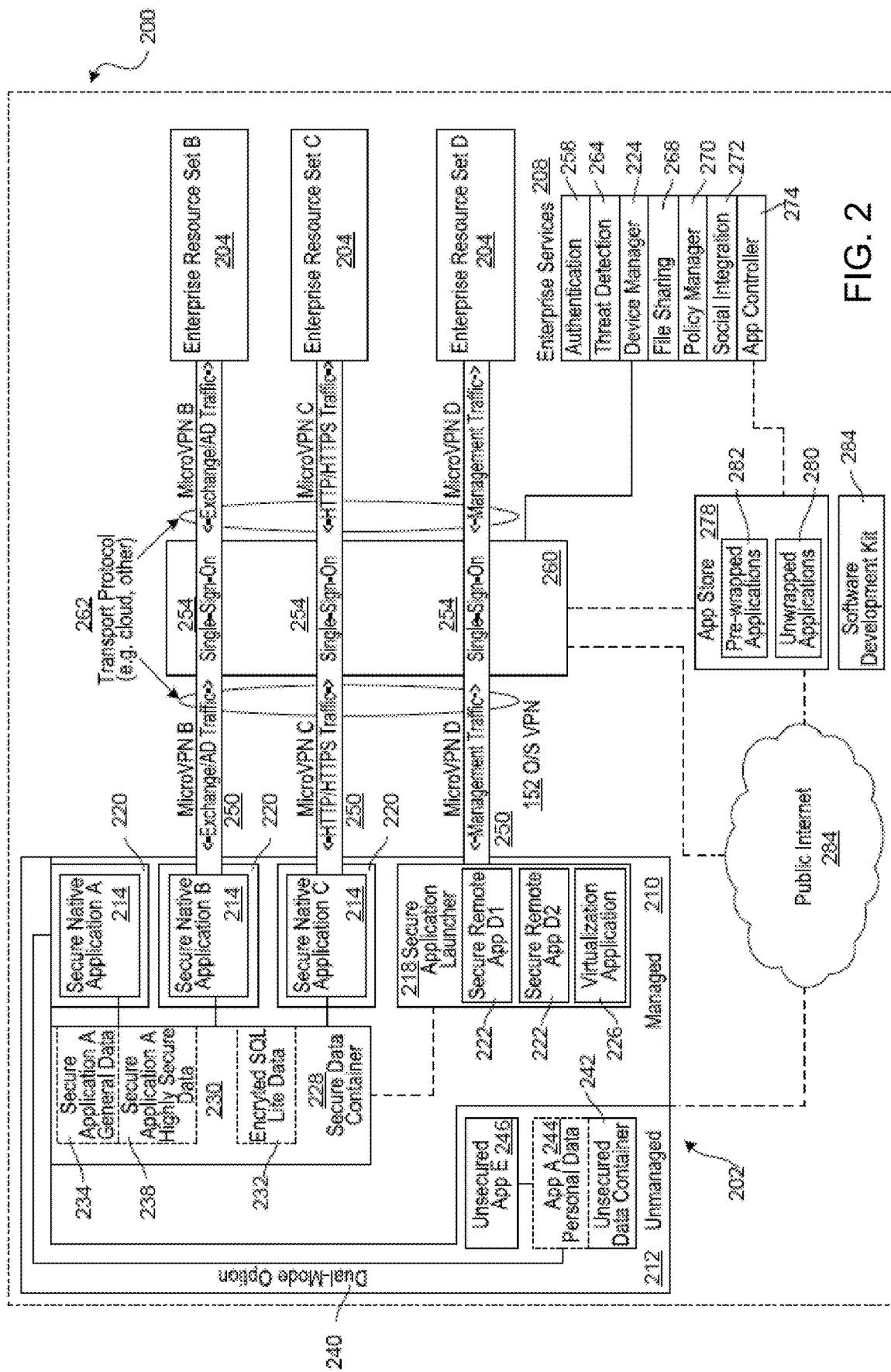
FIG. 2 is a block diagram of an illustrative embodiment of cloud services for use in accessing resources.

FIG. 2 illustrates an embodiment of cloud services for use in accessing resources including network applications. The cloud services can include an enterprise mobility technical architecture 200, which can include an access gateway 260 in one illustrative embodiment. The architecture can be used in a bring-your-own-device (BYOD) environment for instance. The architecture can enable a user of a client device 204 (e.g., a mobile or other device) to both access enterprise or personal resources from a client device 202, and use the client device 204 for personal use. The user can access such enterprise resources 204 or enterprise services 208 via a client application executing on the client device 204. The user can access such enterprise resources 204 or enterprise services 208 using a client device 204 that is purchased by the user or a client device 202 that is provided by the enterprise to user. The user can utilize the client device 202 for business use only or for business and personal use. The client device can run an iOS operating system, and Android operating system, or the like. The enterprise can choose to implement policies to manage the client device 204. The policies can be implanted through a firewall or gateway in such a way that the client device can be identified, secured or security verified, and provided selective or full access to the enterprise resources. The policies can be client device management policies, mobile application management policies, mobile data management policies, or some combination of client device, application, and data management policies. A client device 204 that is managed through the application of client device management policies can be referred to as an enrolled device. The client device management policies can be applied via the client application for instance.

In some embodiments, the operating system of the client device can be separated into a managed partition 210 and an unmanaged partition 212. The managed partition 210 can have policies applied to it to secure the applications running on and data stored in the managed partition. The applications running on the managed partition can be secure applications. In other embodiments, all applications can execute a set of one or more policy files received separate from the application, and which define one or more security parameters, features, resource restrictions, and/or other access controls that are enforced by the client device management system when that application is executing on the device. By operating using their respective policy file(s), each application can be allowed or restricted from communications with one or more other applications and/or resources, thereby creating a virtual partition. Thus, as used herein, a partition can refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps can be restricted to only be able to communicate with other managed apps and trusted enterprise resources, thereby creating a virtual partition that is not accessible by unmanaged apps and devices.

The secure applications can be email applications, web browsing applications, software-as-a-service (SaaS) access applications, Windows Application access applications, and the like. The client application can include a secure application launcher 218. The secure applications can be secure native applications 214, secure remote applications 222 executed by the secure application launcher 218, virtualization applications 226 executed by the secure application launcher 218, and the like. The secure native applications 214 can be wrapped by a secure application wrapper 220. The secure application wrapper 220 can include integrated policies that are executed on the client device 202 when the secure native application is executed on the device. The secure application wrapper 220 can include meta-data that points the secure native application 214 running on the client device 202 to the resources hosted at the enterprise that the secure native application 214 can require to complete the task requested upon execution of the secure native application 214. The secure remote applications 222 executed by a secure application launcher 218 can be executed within the secure application launcher application 218. The virtualization applications 226 executed by a secure application launcher 218 can utilize resources on the client device 202, at the enterprise resources 204, and the like. The resources used on the client device 202 by the virtualization applications 226 executed by a secure application launcher 218 can include user interaction resources, processing resources, and the like. The user interaction resources can be used to collect and transmit keyboard input, mouse input, camera input, tactile input, audio input, visual input, gesture input, and the like. The processing resources can be used to present a user interface, process data received from the enterprise resources 204, and the like. The resources used at the enterprise resources 204 by the virtualization applications 226 executed by a secure application launcher 218 can include user interface generation resources, processing resources, and the like. The user interface generation resources can be used to assemble a user interface, modify a user interface, refresh a user interface, and the like. The processing resources can be used to create information, read information, update information, delete information, and the like. For example, the virtualization application can record user interactions associated with a graphical user interface (GUI) and communicate them to a server application where the server application can use the user interaction data as an input to the application operating on the server. In this arrangement, an enterprise can elect to maintain the application on the server side as well as data, files, etc., associated with the application. While an enterprise can elect to "mobilize" some applications using the principles herein by securing them for deployment on the client device (e.g., via the client application), this arrangement can also be elected for certain applications. For example, while some applications can be secured for use on the client device, others might not be prepared or appropriate for deployment on the client device so the enterprise can elect to provide the mobile user access to the unprepared applications through virtualization techniques. As another example, the enterprise can have large complex applications with large and complex data sets (e.g., material resource planning applications) where it would be very difficult, or otherwise undesirable, to customize the application for the client device so the enterprise can elect to provide access to the application through virtualization techniques. As yet another example, the enterprise can have an application that maintains highly secured data (e.g., human resources data, customer data, engineering data) that can be deemed by the enterprise as too sensitive for even the secured mobile environment so the enterprise can elect to use virtualization techniques to permit mobile access to such applications and data. An enterprise can elect to provide both fully secured and fully functional applications on the client device. The enterprise can use a client application, which can include a virtualization application, to allow access to applications that are deemed more properly operated on the server side. In an embodiment, the virtualization application can store some data, files, etc., on the mobile phone in one of the secure storage locations. An enterprise, for example, can elect to allow certain information to be stored on the phone while not permitting other information.

In connection with the virtualization application, as described herein, the client device can have a virtualization application that is designed to present GUIs and then record user interactions with the GUI. The virtualization application can communicate the user interactions to the server side to be used by the server side application as user interactions with the application. In response, the application on the server side can transmit back to the client device a new GUI. For example, the new GUI can be a static page, a dynamic page, an animation, or the like, thereby providing access to remotely located resources.

The secure applications can access data stored in a secure data container 228 in the managed partition 210 of the client device. The data secured in the secure data container can be accessed by the secure wrapped applications 214, applications executed by a secure application launcher 222, virtualization applications 226 executed by a secure application launcher 218, and the like. The data stored in the secure data container 228 can include files, databases, and the like. The data stored in the secure data container 228 can include data restricted to a specific secure application 230, shared among secure applications 232, and the like. Data restricted to a secure application can include secure general data 234 and highly secure data 238. Secure general data can use a strong form of encryption such as Advanced Encryption Standard (AES) 128-bit encryption or the like, while highly secure data 238 can use a very strong form of encryption such as AES 256-bit encryption. Data stored in the secure data container 228 can be deleted from the device upon receipt of a command from the device manager 224. The secure applications can have a dual-mode option 240. The dual mode option 240 can present the user with an option to operate the secured application in an unsecured or unmanaged mode. In an unsecured or unmanaged mode, the secure applications can access data stored in an unsecured data container 242 on the unmanaged partition 212 of the client device 202. The data stored in an unsecured data container can be personal data 244. The data stored in an unsecured data container 242 can also be accessed by unsecured applications 248 that are running on the unmanaged partition 212 of the client device 202. The data stored in an unsecured data container 242 can remain on the client device 202 when the data stored in the secure data container 228 is deleted from the client device 202. An enterprise can want to delete from the client device selected or all data, files, and/or applications owned, licensed or controlled by the enterprise (enterprise data) while leaving or otherwise preserving personal data, files, and/or applications owned, licensed or controlled by the user (personal data). This operation can be referred to as a selective wipe. With the enterprise and personal data arranged as described herein, an enterprise can perform a selective wipe.

The client device 202 can connect to enterprise resources 204 and enterprise services 208 at an enterprise, to the public Internet 248, and the like. The client device can connect to enterprise resources 204 and enterprise services 208 through virtual private network connections. The virtual private network connections, also referred to as microVPN or application-specific VPN, can be specific to particular applications (e.g., as illustrated by microVPNs 250), particular devices, particular secured areas on the client device (e.g., as illustrated by O/S VPN 252), and the like. For example, each of the wrapped applications in the secured area of the phone can access enterprise resources through an application specific VPN such that access to the VPN would be granted based on attributes associated with the application, possibly in conjunction with user or device attribute information. The virtual private network connections can carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections can support and enable single-sign-on authentication processes 254. The single-sign-on processes can allow a user to provide a single set of authentication credentials, which are then verified by an authentication service 258. The authentication service 258 can then grant to the user access to multiple enterprise resources 204, without requiring the user to provide authentication credentials to each individual enterprise resource 204.

The virtual private network connections can be established and managed by an access gateway 260. The access gateway 260 can include performance enhancement features that manage, accelerate, and improve the delivery of enterprise resources 204 to the client device 202. The access gateway can also re-route traffic from the client device 202 to the public Internet 248, enabling the client device 202 to access publicly available and unsecured applications that run on the public Internet 248. The client device can connect to the access gateway via a transport network 262. The transport network 262 can use one or more transport protocols and can be a wired network, wireless network, cloud network, local area network, metropolitan area network, wide area network, public network, private network, and the like.

The enterprise resources 204 can include email servers, file sharing servers, SaaS/Web applications, Web application servers, Windows application servers, and the like. Email servers can include Exchange servers, Lotus Notes servers, and the like. File sharing servers can include ShareFile servers, and the like. SaaS applications can include Salesforce, and the like. Windows application servers can include any application server that is built to provide applications that are intended to run on a local Windows operating system, and the like. The enterprise resources 204 can be premise-based resources, cloud based resources, and the like. The enterprise resources 204 can be accessed by the client device 202 directly or through the access gateway 260. The enterprise resources 204 can be accessed by the client device 202 via a transport network 262. The transport network 262 can be a wired network, wireless network, cloud network, local area network, metropolitan area network, wide area network, public network, private network, and the like.

Cloud services can include an access gateway 260 and/or enterprise services 208. The enterprise services 208 can include authentication services 258, threat detection services 264, device manager services 224, file sharing services 268, policy manager services 270, social integration services 272, application controller services 274, and the like. Authentication services 258 can include user authentication services, device authentication services, application authentication services, data authentication services and the like. Authentication services 258 can use certificates. The certificates can be stored on the client device 202, by the enterprise resources 204, and the like. The certificates stored on the client device 202 can be stored in an encrypted location on the client device, the certificate can be temporarily stored on the client device 202 for use at the time of authentication, and the like. Threat detection services 264 can include intrusion detection services, unauthorized access attempt detection services, and the like. Unauthorized access attempt detection services can include unauthorized attempts to access devices, applications, data, and the like. Device management services 224 can include configuration, provisioning, security, support, monitoring, reporting, and decommissioning services. File sharing services 268 can include file management services, file storage services, file collaboration services, and the like. Policy manager services 270 can include device policy manager services, application policy manager services, data policy manager services, and the like. Social integration services 272 can include contact integration services, collaboration services, integration with social networks such as Facebook, Twitter, and LinkedIn, and the like. Application controller services 274 can include management services, provisioning services, deployment services, assignment services, revocation services, wrapping services, and the like.

The enterprise mobility technical architecture 200 can include an application store 278. The application store 278 can include unwrapped applications 280, pre-wrapped applications 282, and the like. Applications can be populated in the application store 278 from the application controller 274. The application store 278 can be accessed by the client device 202 through the access gateway 260, through the public Internet 248, or the like. The application store can be provided with an intuitive and easy to use User Interface.

A software development kit 284 can provide a user the capability to secure applications selected by the user by providing a secure wrapper around the application. An application that has been wrapped using the software development kit 284 can then be made available to the client device 202 by populating it in the application store 278 using the application controller 274.

The enterprise mobility technical architecture 200 can include a management and analytics capability. The management and analytics capability can provide information related to how resources are used, how often resources are used, and the like. Resources can include devices, applications, data, and the like. How resources are used can include which devices download which applications, which applications access which data, and the like. How often resources are used can include how often an application has been downloaded, how many times a specific set of data has been accessed by an application, and the like.

Figure 3:
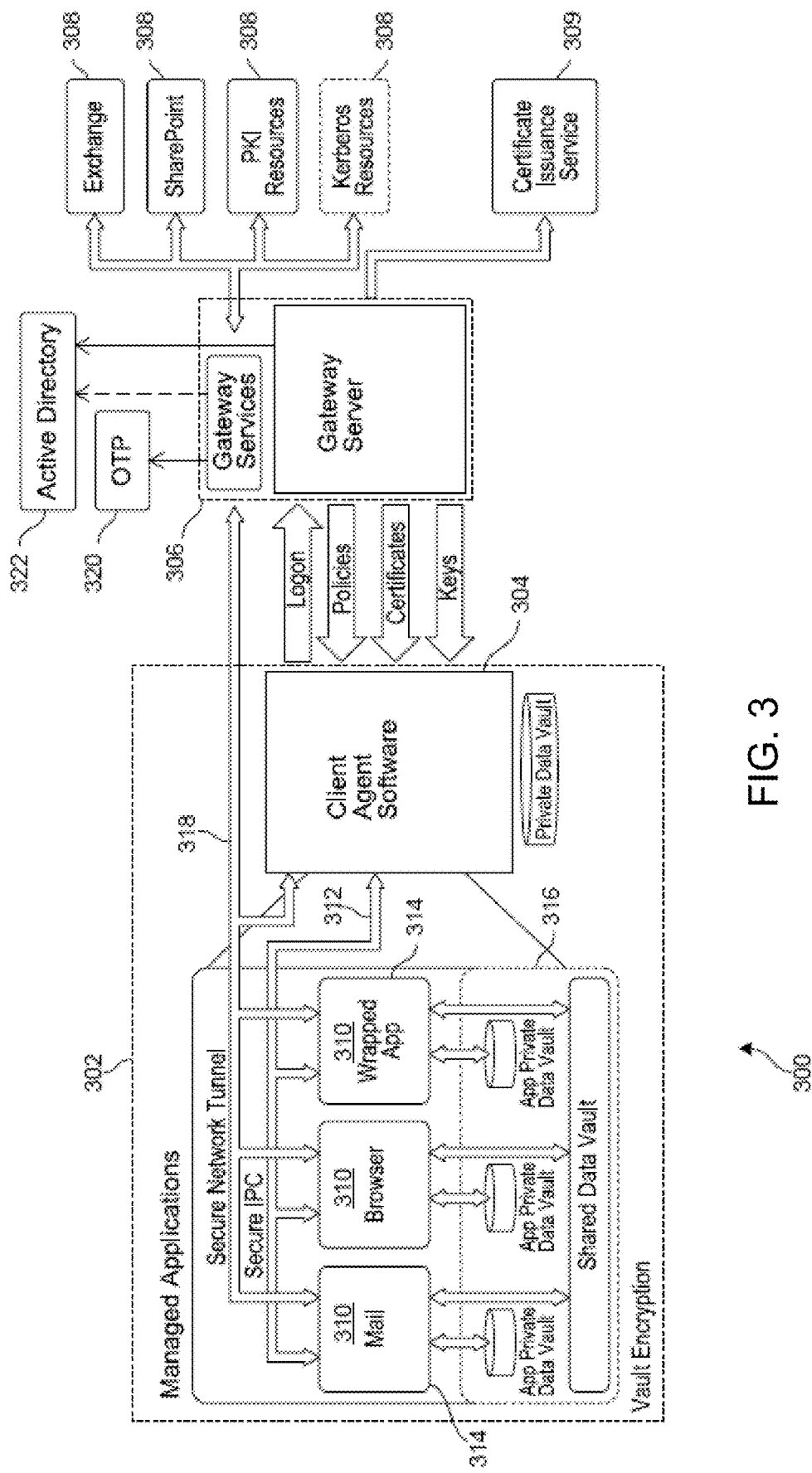
FIG. 3 is a block diagram of an example embodiment of an enterprise mobility management system.

FIG. 3 depicts is an illustrative embodiment of an enterprise mobility management system 300. Some of the components of the mobility management system 200 described above with reference to FIG. 2 have been omitted for the sake of simplicity. The architecture of the system 300 depicted in FIG. 3 is similar in many respects to the architecture of the system 200 described above with reference to FIG. 2 and can include additional features not mentioned above.

In this case, the left hand side represents an enrolled client device 302 with a client agent 304, which interacts with gateway server 306 to access various enterprise resources 308 and services 309 such as Web or SasS applications, Exchange, Sharepoint, public-key infrastructure (PKI) Resources, Kerberos Resources, Certificate Issuance service, as shown on the right hand side above. The gateway server 306 can include embodiments of features and functionalities of the cloud services, such as access gateway 260 and application controller functionality. Although not specifically shown, the client agent 304 can be part of, and/or interact with the client application which can operate as an enterprise application store (storefront) for the selection and/or downloading of network applications.

The client agent 304 can act as a UI (user interface) intermediary for Windows apps/desktops hosted in an Enterprise data center, which are accessed using the High-Definition User Experience (HDX) or Independent Computing Architecture (ICA) display remoting protocol. The client agent 304 can also support the installation and management of native applications on the client device 302, such as native iOS or Android applications. For example, the managed applications 310 (mail, browser, wrapped application) shown in the figure above are native applications that execute locally on the device. Client agent 304 and application management framework of this architecture act to provide policy driven management capabilities and features such as connectivity and SSO (single sign on) to enterprise resources/services 308. The client agent 304 handles primary user authentication to the enterprise, for instance to access gateway (AG) with SSO to other gateway server components. The client agent 304 obtains policies from gateway server 306 to control the behavior of the managed applications 310 on the client device 302.

The Secure interprocess communication (IPC) links 312 between the native applications 310 and client agent 304 represent a management channel, which allows client agent to supply policies to be enforced by the application management framework 314 "wrapping" each application. The IPC channel 312 also allows client agent 304 to supply credential and authentication information that enables connectivity and SSO to enterprise resources 308. Finally the IPC channel 312 allows the application management framework 314 to invoke user interface functions implemented by client agent 304, such as online and offline authentication.

Communications between the client agent 304 and gateway server 306 are essentially an extension of the management channel from the application management framework 314 wrapping each native managed application 310. The application management framework 314 requests policy information from client agent 304, which in turn requests it from gateway server 306. The application management framework 314 requests authentication, and client agent 304 logs into the gateway services part of gateway server 306 (also known as NetScaler access gateway). Client agent 304 can also call supporting services on gateway server 306, which can produce input material to derive encryption keys for the local data vaults 316, or provide client certificates which can enable direct authentication to PKI protected resources, as more fully explained below.

In more detail, the application management framework 314 "wraps" each managed application 310. This can be incorporated via an explicit build step, or via a post-build processing step. The application management framework 314 can "pair" with client agent 304 on first launch of an application 310 to initialize the Secure IPC channel and obtain the policy for that application. The application management framework 314 can enforce relevant portions of the policy that apply locally, such as the client agent login dependencies and some of the containment policies that restrict how local OS services can be used, or how they can interact with the application 310.

The application management framework 314 can use services provided by client agent 304 over the Secure IPC channel 312 to facilitate authentication and internal network access. Key management for the private and shared data vaults 316 (containers) can be also managed by appropriate interactions between the managed applications 310 and client agent 304. Vaults 316 can be available only after online authentication, or can be made available after offline authentication if allowed by policy. First use of vaults 316 can require online authentication, and offline access can be limited to at most the policy refresh period before online authentication is again required.

Network access to internal resources can occur directly from individual managed applications 310 through access gateway 306. The application management framework 314 is responsible for orchestrating the network access on behalf of each application 310. Client agent 304 can facilitate these network connections by providing suitable time limited secondary credentials obtained following online authentication. Multiple modes of network connection can be used, such as reverse web proxy connections and end-to-end VPN-style tunnels 318.

The Mail and Browser managed applications 310 can have special status and can make use of facilities that might not be generally available to arbitrary wrapped applications. For example, the Mail application can use a special background network access mechanism that allows it to access Exchange over an extended period of time without requiring a full AG logon. The Browser application can use multiple private data vaults to segregate different kinds of data.

This architecture can support the incorporation of various other security features. For example, gateway server 306 (including its gateway services) in some cases might not need to validate active directory (AD) passwords. It can be left to the discretion of an enterprise whether an AD password is used as an authentication factor for some users in some situations. Different authentication methods can be used if a user is online or offline (i.e., connected or not connected to a network).

Step up authentication is a feature wherein gateway server 306 can identify managed native applications 310 that are allowed to have access to more sensitive data using strong authentication, and ensure that access to these applications is only permitted after performing appropriate authentication, even if this means a re-authentication is requested from the user after a prior weaker level of login.

Another security feature of this solution is the encryption of the data vaults 316 (containers) on the client device 302. The vaults 316 can be encrypted so that all on-device data including clipboard/cache data, files, databases, and configurations are protected. For on-line vaults, the keys can be stored on the server (gateway server 306), and for off-line vaults, a local copy of the keys can be protected by a user password or biometric validation. When data is stored locally on the device 302 in the secure container 316, it is preferred that a minimum of AES 256 encryption algorithm be utilized.

Other secure container features can also be implemented. For example, a logging feature can be included, wherein all security events happening inside an application 310 are logged and reported to the backend. Data wiping can be supported, such as if the application 310 detects tampering, associated encryption keys can be written over with random data, leaving no hint on the file system that user data was destroyed. Screenshot protection is another feature, where an application can prevent any data from being stored in screenshots. For example, the key window's hidden property can be set to YES. This can cause whatever content is currently displayed on the screen to be hidden, resulting in a blank screenshot where any content would normally reside.

Local data transfer can be prevented, such as by preventing any data from being locally transferred outside the application container, e.g., by copying it or sending it to an external application. A keyboard cache feature can operate to disable the autocorrect functionality for sensitive text fields. SSL certificate validation can be operable so the application specifically validates the server SSL certificate instead of it being stored in the keychain. An encryption key generation feature can be used such that the key used to encrypt data on the device is generated using a passphrase or biometric data supplied by the user (if offline access is required). It can be XORed with another key randomly generated and stored on the server side if offline access is not required. Key Derivation functions can operate such that keys generated from the user password use KDFs (key derivation functions, notably Password-Based Key Derivation Function 2 (PB-KDF2)) rather than creating a cryptographic hash of it. The latter makes a key susceptible to brute force or dictionary attacks.

Further, one or more initialization vectors can be used in encryption methods. An initialization vector might cause multiple copies of the same encrypted data to yield different cipher text output, preventing both replay and cryptanalytic attacks. This can also prevent an attacker from decrypting any data even with a stolen encryption key. Further, authentication then decryption can be used, wherein application data is decrypted only after the user has authenticated within the application. Another feature can relate to sensitive data in memory, which can be kept in memory (and not in disk) only when it's needed. For example, login credentials can be wiped from memory after login, and encryption keys and other data inside objective-C instance variables are not stored, as they can be easily referenced. Instead, memory can be manually allocated for these.

An inactivity timeout can be implemented via the CEB, wherein after a policy-defined period of inactivity, a user session is terminated.

Data leakage from the application management framework 314 can be prevented in other ways. For example, when an application 310 is put in the background, the memory can be cleared after a predetermined (configurable) time period. When backgrounded, a snapshot can be taken of the last displayed screen of the application to fasten the foregrounding process. The screenshot can contain confidential data and hence should be cleared.

Another security feature relates to the use of an OTP (one time password) 320 without the use of an AD (active directory) 322 password for access to one or more applications. In some cases, some users do not know (or are not permitted to know) their AD password, so these users can authenticate using an OTP 320 such as by using a hardware OTP system like SecurID (OTPs can be provided by different vendors also, such as Entrust or Gemalto). In some cases, after a user authenticates with a user ID, a text is sent to the user with an OTP 320. In some cases, this can be implemented only for online use, with a prompt being a single field.

An offline password can be implemented for offline authentication for those applications 310 for which offline use is permitted via enterprise policy. For example, an enterprise can want storefront to be accessed in this manner. In this case, the client agent 304 can require the user to set a custom offline password and the AD password is not used. Gateway server 306 can provide policies to control and enforce password standards with respect to the minimum length, character class composition, and age of passwords, such as described by the standard Windows Server password complexity requirements, although these requirements can be modified.

Another feature relates to the enablement of a client side certificate for certain applications 310 as secondary credentials (for the purpose of accessing PKI protected web resources via the application management framework micro VPN feature). For example, an application can utilize such a certificate. In this case, certificate-based authentication using ActiveSync protocol can be supported, wherein a certificate from the client agent 304 can be retrieved by gateway server 306 and used in a keychain. Each managed application can have one associated client certificate, identified by a label that is defined in gateway server 306.

Gateway server 306 can interact with an Enterprise special purpose web service to support the issuance of client certificates to allow relevant managed applications to authenticate to internal PKI protected resources.

The client agent 304 and the application management framework 314 can be enhanced to support obtaining and using client certificates for authentication to internal PKI protected network resources. More than one certificate can be supported, such as to match various levels of security and/or separation requirements. The certificates can be used by the Mail and Browser managed applications, and ultimately by arbitrary wrapped applications (provided those applications use web service style communication patterns where it is reasonable for the application management framework to mediate https requests).

Application management client certificate support on iOS can rely on importing a public-key cryptography standards (PKCS) 12 BLOB (Binary Large Object) into the iOS keychain in each managed application for each period of use. Application management framework client certificate support can use a HTTPS implementation with private in-memory key storage. The client certificate might never be present in the iOS keychain and might not be persisted except potentially in "online-only" data value that is strongly protected.

Mutual SSL or TLS can also be implemented to provide additional security by requiring that a client device 302 is authenticated to the enterprise, and vice versa. Virtual smart cards for authentication to gateway server 306 can also be implemented.

Both limited and full Kerberos support can be additional features. The full support feature relates to an ability to do full Kerberos login to Active Directory (AD) 322, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which can automatically occur upon jail-break or rooting detections, and occur as a pushed command from administration console, and can include a remote wipe functionality even when an application 310 is not running.

A multi-site architecture or configuration of enterprise application store and an application controller can be supported that allows users to be service from one of several different locations in case of failure.

In some cases, managed applications 310 can be allowed to access a certificate and private key via an API (example OpenSSL). Trusted managed applications 310 of an enterprise can be allowed to perform specific Public Key operations with an application's client certificate and private key. Various use cases can be identified and treated accordingly, such as when an application behaves like a browser and no certificate access is used, when an application reads a certificate for "who am I," when an application uses the certificate to build a secure session token, and when an application uses private keys for digital signing of important data (e.g., transaction log) or for temporary data encryption.

Figure 4:
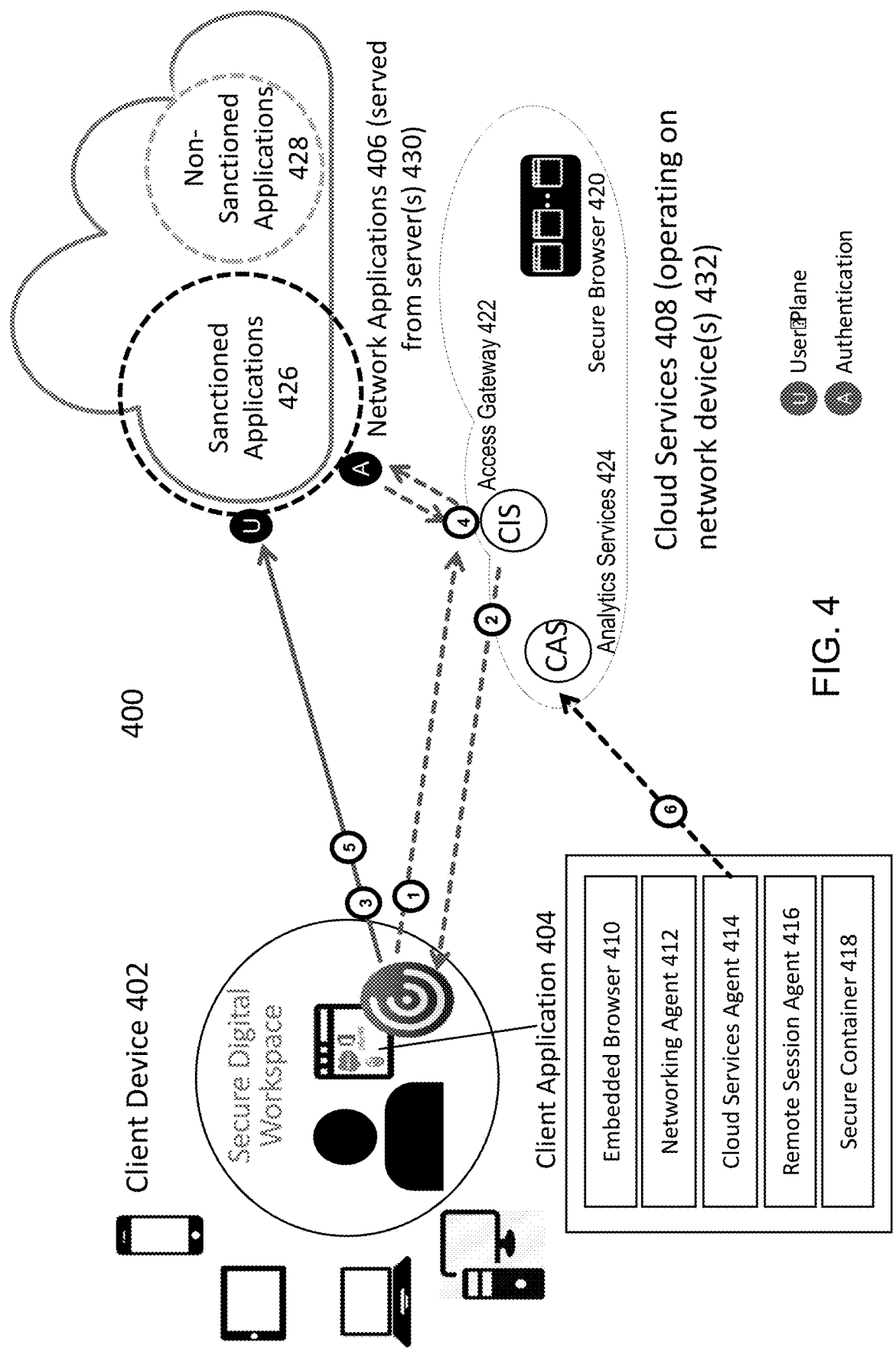
FIG. 4 is a block diagram of a system 400 of an embedded browser.

Referring now to FIG. 4, depicted is a block diagram of a system 400 of an embedded browser. In brief overview, the system 400 can include a client device 402 with a digital workspace for a user, a client application 404, cloud services 408 operating on at least one network device 432, and network applications 406 served from and/or hosted on one or more servers 430. The client application 404 can for instance include at least one of: an embedded browser 410, a networking agent 412, a cloud services agent 414, a remote session agent 416, or a secure container 418. The cloud services 408 can for instance include at least one of: secure browser(s) 420, an access gateway 422 (or CIS, e.g., for registering and/or authenticating the client application and/or user), or analytics services 424 (or CAS, e.g., for receiving information from the client application for analytics). The network applications 406 can include sanctioned applications 426 and non-sanctioned applications 428.

Each of the above-mentioned elements or entities is implemented in hardware, or a combination of hardware and software, in one or more embodiments. Each component of the system 400 can be implemented using hardware or a combination of hardware or software detailed above in connection with FIG. 1. For instance, each of these elements or entities can include any application, program, library, script, task, service, process or any type and form of executable instructions executing on hardware of the client device 402, the at least one network device 432 and/or the one or more servers 430. The hardware includes circuitry such as one or more processors in one or more embodiments. For example, the at least one network device 432 and/or the one or more servers 430 can include any of the elements of a computing device described above in connection with at least FIG. 1 for instance.

The client device 402 can include any embodiment of a computing device described above in connection with at least FIG. 1 for instance. The client device 402 can be any user device such as a desktop computer, a laptop computer, a tablet device, a smart phone, or any other mobile or personal device. The client device 402 can include a digital workspace of a user, which can include file system(s), cache or memory (e.g., including electronic clipboard(s)), container(s), application(s) and/or other resources on the client device 402. The digital workspace can include or extend to one or more networks accessible by the client device 402, such as an intranet and the Internet, including file system(s) and/or other resources accessible via the one or more networks. A portion of the digital workspace can be secured via the use of the client application 404 with embedded browser 410 (CEB) for instance. The secure portion of the digital workspace can include for instance file system(s), cache or memory (e.g., including electronic clipboard(s)), application(s), container(s) and/or other resources allocated to the CEB 410, and/or allocated by the CEB to network application(s) 406 accessed via the CEB. The secure portion of the digital workspace can also include resources specified by the CEB (via one or more policies) for inclusion in the secure portion of the digital workspace (e.g., a particular local application can be specified via a policy to be allowed to receive data obtained from a network application).

The client application 404 can include one or more components, such as an embedded browser 410, a networking agent 412, a cloud services agent 414 (sometimes referred to as management agent), a remote session agent 416 (sometimes referred to as HDX engine), and/or a secure container 418 (sometimes referred to as secure cache container). One or more of the components can be installed as part of a software build or release of the client application 404 or CEB, or separately acquired or downloaded and installed/integrated into an existing installation of the client application 404 or CEB for instance. For instance, the client device can download or otherwise receive the client application 404 (or any component) from the network device(s) 432. In some embodiments, the client device can send a request for the client application 404 to the network device(s) 432. For example, a user of the client device can initiate a request, download and/or installation of the client application. The network device(s) 432 in turn can send the client application to the client device. In some embodiments, the network device(s) 432 can send a setup or installation application for the client application to the client device. Upon receipt, the client device can install the client application onto a hard disk of the client device. In some embodiments, the client device can run the setup application to unpack or decompress a package of the client application. In some embodiments, the client application can be an extension (e.g., an add-on, an add-in, an applet or a plug-in) to another application (e.g., a cloud services agent 414) installed on the client device. The client device can install the client application to interface or inter-operate with the pre-installed application. In some embodiments, the client application can be a standalone application. The client device can install the client application to execute as a separate process.

The embedded browser 410 can include elements and functionalities of a web browser application or engine. The embedded browser 410 can locally render network application(s) as a component or extension of the client application. For instance, the embedded browser 410 can render a SaaS/Web application inside the CEB which can provide the CEB with full visibility and control of the application session. The embedded browser can be embedded or incorporated into the client application via any means, such as direct integration (e.g., programming language or script insertion) into the executable code of the client application, or via plugin installation. For example, the embedded browser can include a Chromium based browser engine or other type of browser engine, that can be embedded into the client application, using the Chromium embedded framework (CEF) for instance. The embedded browser can include a HTML5-based layout graphical user interface (GUI). The embedded browser can provide HTML rendering and JavaScript support to a client application incorporating various programming languages. For example, elements of the embedded browser can bind to a client application incorporating C, C++, Delphi, Go, Java, .NET/Mono, Visual Basic 6.0, and/or Python.

In some embodiments, the embedded browser comprises a plug-in installed on the client application. For example, the plug-in can include one or more components. One such component can be an ActiveX control or Java control or any other type and/or form of executable instructions capable of loading into and executing in the client application. For example, the client application can load and run an Active X control of the embedded browser, such as in a memory space or context of the client application. In some embodiments, the embedded browser can be installed as an extension on the client application, and a user can choose to enable or disable the plugin or extension. The embedded browser (e.g., via the plugin or extension) can form or operate as a secured browser for securing, using and/or accessing resources within the secured portion of the digital workspace.

The embedded browser can incorporate code and functionalities beyond that available or possible in a standard or typical browser. For instance, the embedded browser can bind with or be assigned with a secured container 418, to define at least part of the secured portion of a user's digital workspace. The embedded browser can bind with or be assigned with a portion of the client device's cache to form a secured clipboard (e.g., local to the client device, or extendable to other devices), that can be at least part of the secured container 418. The embedded browser can be integrated with the client application to ensure that traffic related to network applications is routed through and/or processed in the client application, which can provide the client application with real-time visibility to the traffic (e.g., when decrypted through the client application). This visibility to the traffic can allow the client application to perform or facilitate policy-based management (e.g., including data loss prevention (DLP) capabilities), application control, and collection and production of analytics.

In some embodiments, the embedded browser incorporates one or more other components of the client application 404, such as the cloud services agent 414, remote session agent 416 and/or secure container 418. For instance, a user can use the cloud services agent 414 of the embedded browser to interoperate with the access gateway 422 (sometimes referred to as CIS) to access a network application. For example, the cloud services agent 414 can execute within the embedded browser, and can receive and transmit navigation commands from the embedded browser to a hosted network application. The cloud services agent can use a remote presentation protocol to display the output generated by the network application to the embedded browser. For example, the cloud services agent 414 can include a HTML5 web client that allows end users to access remote desktops and/or applications on the embedded browser.

The client application 404 and CEB operate on the application layer of the operational (OSI) stack of the client device. The client application 404 can include and/or execute one or more agents that interoperate with the cloud services 408. The client application 404 can receive, obtain, retrieve or otherwise access various policies (e.g., an enterprise's custom, specified or internal policies or rules) and/or data (e.g., from an access gateway 422 and/or network device(s) of cloud services 408, or other server(s), that can be managed by the enterprise). The client application can access the policies and/or data to control and/or manage a network application (e.g., a SaaS, web or remote-hosted application). Control and/or management of a network application can include control and/or management of various aspects of the network application, such as access control, session delivery, available features or functions, service level, traffic management and monitoring, and so on. The network application can be from a provider or vendor of the enterprise (e.g., salesforce.com, SAP, Microsoft Office 365), from the enterprise itself, or from another entity (e.g., Dropbox or Gmail service).

For example, the cloud services agent 414 can provide policy driven management capabilities and features related to the use and/or access of network applications. For example, the cloud services agent 414 can include a policy engine to apply one or more policies (e.g., received from cloud services) to determine access control and/or connectivity to resources such as network applications. When a session is established between the client application and a server 430 providing a SaaS application for instance, the cloud services agent 414 can apply one or more policies to control traffic levels and/or traffic types (or other aspects) of the session, for instance to manage a service level of the SaaS application. Additional aspects of the application traffic that can be controlled or managed can include encryption level and/or encryption type applied to the traffic, level of interactivity allowed for a user, limited access to certain features of the network application (e.g., print-screen, save, edit or copy functions), restrictions to use or transfer of data obtained from the network application, limit concurrent access to two or more network applications, limit access to certain file repositories or other resources, and so on.

The cloud services agent 414 can convey or feed information to analytics services 424 of the cloud services 408, such as information about SaaS interaction events visible to the CEB. Such a configuration using the CEB can monitor or capture information for analytics without having an inline device or proxy located between the client device and the server(s) 430, or using a SaaS API gateway 'out-of-band' approach. In some embodiments, the cloud services agent 414 does not execute within the embedded browser. In these embodiments, a user can similarly use the cloud services agent 414 to interoperate with the access gateway (or CIS) 422 to access a network application. For instance, the cloud services agent 414 can register and/or authenticate with the access gateway (or CIS) 422, and can obtain a list of the network applications from the access gateway (or CIS) 422. The cloud services agent 414 can include and/or operate as an application store (or storefront) for user selection and/or downloading of network applications. Upon logging in to access a network application, the cloud services agent 414 can intercept and transmit navigation commands from the embedded browser to the network application. The cloud services agent can use a remote presentation protocol to display the output generated by the network application to the embedded browser. For example, the cloud services agent 414 can include a HTML5 web client that allows end users to access remote desktops and/or applications on the embedded browser.

In some embodiments, the cloud services agent 414 provides single sign on (SSO) capability for the user and/or client device to access a plurality of network applications. The cloud services agent 414 can perform user authentication to access network applications as well as other network resources and services, by communicating with the access gateway 422 for instance. For example, the cloud services agent 414 can authenticate or register with the access gateway 422, to access other components of the cloud services 408 and/or the network applications 406. Responsive to the authentication or registration, the access gateway 422 can perform authentication and/or SSO for (or on behalf of) the user and/or client application, with the network applications.

The client application 404 can include a networking agent 412. The networking agent 412 is sometimes referred to as a software-defined wide area network (SD-WAN) agent, mVPN agent, or microVPN agent. The networking agent 412 can establish or facilitate establishment of a network connection between the client application and one or more resources (e.g., server 430 serving a network application). The networking agent 412 can perform handshaking for a requested connection from the client application to access a network application, and can establish the requested connection (e.g., secure or encrypted connection). The networking agent 412 can connect to enterprise resources (including services) for instance via a virtual private network (VPN). For example, the networking agent 412 can establish a secure socket layer (SSL) VPN between the client application and a server 430 providing the network application 406. The VPN connections, sometimes referred to as microVPN or application-specific VPN, can be specific to particular network applications, particular devices, particular secured areas on the client device, and the like, for instance as discussed above in connection with FIG. 3. Such VPN connections can carry Microsoft Exchange traffic, Microsoft Active Directory traffic, HyperText Transfer Protocol (HTTP) traffic, HyperText Transfer Protocol Secure (HTTPS) traffic, as some examples.

The remote session agent 416 (sometimes referred to as HDX engine) can include features of the client agent 304 discussed above in connection with FIG. 2 for instance, to support display a remoting protocol (e.g., HDX or ICA). In some embodiments, the remote session agent 416 can establish a remote desktop session and/or remote application session using any variety of protocols, such as the Remote Desktop Protocol (RDP), Appliance Link Protocol (ALP), Remote Frame Buffer (RFB) Protocol, and ICA Protocol. For example, the remote session agent 416 can establish a remote application session for a user of the client device to access an enterprise network application. The remote session agent 416 can establish the remote application session within or over a secure connection (e.g., a VPN) established by the networking agent 412 for instance.

The client application or CEB can include or be associated with a secure container 418. A secure container can include a logical or virtual delineation of one or more types of resources accessible within the client device and/or accessible by the client device. For example, the secure container 418 can refer to the entirety of the secured portion of the digital workspace, or particular aspect(s) of the secured portion. In some embodiments, the secure container 418 corresponds to a secure cache (e.g., electronic or virtual clipboard), and can dynamically incorporate a portion of a local cache of each client device of a user, and/or a cloud-based cache of the user, that is protected or secured (e.g., encrypted). The secure container can define a portion of file system(s), and/or delineate resources allocated to a CEB and/or to network applications accessed via the CEB. The secure container can include elements of the secure data container 228 discussed above in connection with FIG. 2 for example. The CEB can be configured (e.g., via policies) to limit, disallow or disable certain actions or activities on resources and/or data identified to be within a secure container. A secured container can be defined to specify that the resources and/or data within the secure container are to be monitored for misuse, abuse and/or exfiltration.

In certain embodiments, a secure container relates to or involves the use of a secure browser (e.g., embedded browser 410 or secure browser 420) that implements various enterprise security features. Network applications (or web pages accessed by the secure browser) that are configured to run within the secure browser can effectively inherit the security mechanisms implemented by the secure browser. These network applications can be considered to be contained within the secure container. The use of such a secure browser can enable an enterprise to implement a content filtering policy in which, for example, employees are blocked from accessing certain web sites from their client devices. The secure browser can be used, for example, to enable client device users to access a corporate intranet without the need for a VPN.

In some embodiments, a secure container can support various types of remedial actions for protecting enterprise resources. One such remedy is to lock the client device, or a secure container on the client device that stores data to be protected, such that the client device or secure container can only be unlocked with a valid code provided by an administrator for instance. In some embodiments, these and other types of remedies can be invoked automatically based on conditions detected on the client device (via the application of policies for instance), or can be remotely initiated by an administrator.

In some embodiments, a secure container can include a secure document container for documents. A document can comprise any computer-readable file including text, audio, video, and/or other types of information or media. A document can comprise any single one or combination of these media types. As explained herein, the secure container can help prevent the spread of enterprise information to different applications and components of the client device, as well as to other devices. The enterprise system (which can be partially or entirely within a cloud network) can transmit documents to various devices, which can be stored within the secure container. The secure container can prevent unauthorized applications and other components of the client device from accessing information within the secure container. For enterprises that allow users to use their own client devices for accessing, storing, and using enterprise data, providing secure container on the client devices helps to secure the enterprise data. For instance, providing secure containers on the client devices can centralize enterprise data in one location on each client device, and can facilitate selective or complete deletion of enterprise data from each client device when desired.

The secure container can include an application that implements a file system that stores documents and/or other types of files. The file system can comprise a portion of a computer-readable memory of the client device. The file system can be logically separated from other portions of the computer-readable memory of the client device. In this way, enterprise data can be stored in a secure container and private data can be stored in a separate portion of the computer-readable memory of the client device for instance. The secure container can allow the CEB, network applications accessed via the CEB, locally installed applications and/or other components of the client device to read from, write to, and/or delete information from the file system (if authorized to do so). Deleting data from the secure container can include deleting actual data stored in the secure container, deleting pointers to data stored in the secure container, deleting encryption keys used to decrypt data stored in the secure container, and the like. The secure container can be installed by, e.g., the client application, an administrator, or the client device manufacturer. The secure container can enable some or all of the enterprise data stored in the file system to be deleted without modifying private data stored on the client device outside of the secure container. The file system can facilitate selective or complete deletion of data from the file system. For example, an authorized component of the enterprise's system can delete data from the file system based on, e.g., encoded rules. In some embodiments, the client application can delete the data from the file system, in response to receiving a deletion command from the enterprise's system.

The secure container can include an access manager that governs access to the file system by applications and other components of the client device. Access to the file system can be governed based on document access policies (e.g., encoded rules) maintained by the client application, in the documents and/or in the file system. A document access policy can limit access to the file system based on (1) which application or other component of the client device is requesting access, (2) which documents are being requested, (3) time or date, (4) geographical position of the client device, (5) whether the requesting application or other component provides a correct certificate or credentials, (6) whether the user of the client device provides correct credentials, (7) other conditions, or any combination thereof. A user's credentials can comprise, for example, a password, one or more answers to security questions (e.g., What is the mascot of your high school?), biometric information (e.g., fingerprint scan, eye-scan), and the like. Hence, by using the access manager, the secure container can be configured to be accessed only by applications that are authorized to access the secure container. As one example, the access manager can enable enterprise applications installed on the client device to access data stored in the secure container and to prevent non-enterprise applications from accessing the data stored in the secure container.

Temporal and geographic restrictions on document access can be useful. For example, an administrator can deploy a document access policy that restricts the availability of the documents (stored within the secure container) to a specified time window and/or a geographic zone (e.g., as determined by a GPS chip) within which the client device must reside in order to access the documents. Further, the document access policy can instruct the secure container or client application to delete the documents from the secure container or otherwise make them unavailable when the specified time period expires or if the client device is taken outside of the defined geographic zone.

Some documents can have access policies that forbid the document from being saved within the secure container. In such embodiments, the document can be available for viewing on the client device only when the user is logged in or authenticated via the cloud services for example.

The access manager can also be configured to enforce certain modes of connectivity between remote devices (e.g., an enterprise resource or other enterprise server) and the secure container. For example, the access manager can require that documents received by the secure container from a remote device and/or sent from the secure container to the remote device be transmitted through secured tunnels/ connections, for example. The access manager can require that all documents transmitted to and from the secure container be encrypted. The client application or access manager can be configured to encrypt documents sent from the secure container and decrypt documents sent to the secure container. Documents in the secure container can also be stored in an encrypted form.

The secure container can be configured to prevent documents or data included within documents or the secure container from being used by unauthorized applications or components of the client device or other devices. For instance, a client device application having authorization to access documents from the secure container can be programmed to prevent a user from copying a document's data and pasting it into another file or application interface, or locally saving the document or document data as a new file outside of the secure container. Similarly, the secure container can include a document viewer and/or editor that do not permit such copy/paste and local save operations. Moreover, the access manager can be configured to prevent such copy/paste and local save operations. Further, the secure container and applications programmed and authorized to access documents from the secure container can be configured to prevent users from attaching such documents to emails or other forms of communication.

One or more applications (e.g., applications installed on the client device, and/or network applications accessed via the CEB) can be programmed or controlled (e.g., via policy-based enforcement) to write enterprise-related data only into the secure container. For instance, an application's source code can be provided with the resource name of the secure container. Similarly, a remote application (e.g., executing on a device other than the client device) can be configured to send data or documents only to the secure container (as opposed to other components or memory locations of the client device). Storing data to the secure container can occur automatically, for example, under control of the application, the client application, and/or the secure browser. The client application can be programmed to encrypt or decrypt documents stored or to be stored within the secure container. In certain embodiments, the secure container can only be used by applications (on the client device or a remote device) that are programmed to identify and use the secure container, and which have authorization to do so.

The network applications 406 can include sanctioned network applications 426 and non-sanctioned network applications 428. By way of a non-limiting example, sanctioned network applications 426 can include network applications from Workday, Salesforce, Office 365, SAP, and so on, while non-sanctioned network applications 426 can include network applications from Dropbox, Gmail, and so on. For instance, FIG. 4 illustrates a case where sanctioned applications 426 are accessed via a CEB. In operation (1), a user instance of a client application 404, that is installed on client device 402, can register or authenticate with the access gateway 422 of cloud services 408. For example, the user can authenticate the user to the client device and login to the client device 402. The client application can automatically execute, or be activated by the user. In some embodiments, the user can sign in to the client application (e.g., by authenticating the user to the client application). In response to the login or sign-in, the client application can register or authenticate the user and/or the client application with the access gateway 422.

In operation (2), in response to the registration or authentication of the user, the access gateway 422 can identify or retrieve a list of enumerated network applications available or pre-assigned to the user, and can provide the list to the client application. For example, in response to the registration or authentication, the access gateway can identify the user and/or retrieve a user profile of the user. According to the identity and/or user profile, the access gateway can determine the list (e.g., retrieve a stored list of network applications matched with the user profile and/or the identity of the user). The list can correspond to network applications sanctioned for the user. The access gateway can send the list to the client application or embedded browser, which can be presented via the client application or embedded browser to the user (e.g., in a storefront user interface) for selection.

In operation (3), the user can initiate connection to a sanctioned network application (e.g., a SaaS application), by selecting from the list of network applications presented to the user. For example, the user can click on an icon or other representation of the sanctioned network application, displayed via the client application or embedded browser. This user action can trigger the CEB to transmit a connection or access request to a server that provisions the network application. The request can include a request to the server (e.g., SaaS provider) to communicate with the access gateway to authenticate the user. The server can send a request to the access gateway to authenticate the user for example.

In operation (4), the access gateway can perform SSO with the server, to authenticate the user. For example, in response to the server's request to authenticate the user, the access gateway can provide credentials of the user to the server(s) 430 for SSO, to access the selected network application and/or other sanctioned network applications. In operation (5), the user can log into the selected network application, based on the SSO (e.g., using the credentials). The client application (e.g., the networking agent 412 and/or the remote session agent 416) can establish a secure connection and session with the server(s) 430 to access the selected network application. The CEB can decrypt application traffic received via the secure connection. The CEB can monitor traffic sent via the CEB and the secured connection to the servers 430.

In operation (6), the client application can provide information to the analytics services 424 of cloud services 408, for analytics processing. For example, the cloud services agent 414 of the client application 404 can monitor for or capture user interaction events with the selected network application. The cloud services agent 414 can convey the user interaction events to the analytics services 424, to be processed to produce analytics.

Figure 5:
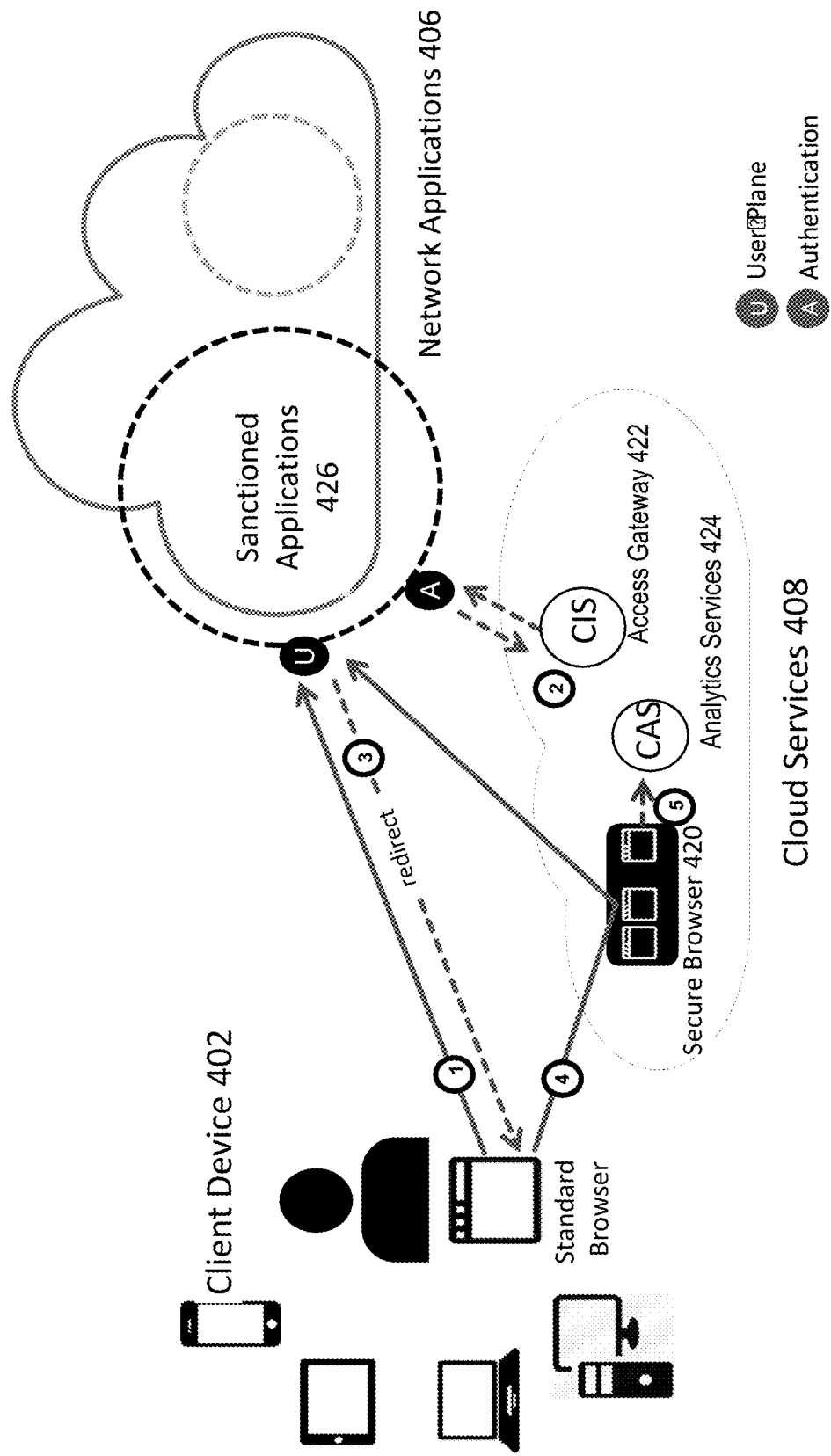
FIG. 5 is a block diagram of an example embodiment of a system for using a secure browser.

FIG. 5 depicts an example embodiment of a system for using a secure browser. In brief overview, the system includes cloud services 408, network applications 406 and client device 402. In some embodiments, various elements of the system are similar to that described above for FIG. 4, but that the client application (with embedded browser) is not available in the client device 402. A non-embedded application browser can be available on the client device, from which a user can initiate a request to access a sanctioned network application for instance. A network application can be specified as being sanctioned or unsanctioned via policies that can be set by an administrator or automatically (e.g., via artificial intelligence).

For example, in operation (1), the user can log into the network application using the standard browser. For accessing a sanctioned network application, the user can access a predefined URL and/or corresponding webpage of a server that provisions the network application, via the standard browser, to initiate a request to access the network application. In some embodiments, the request can be forwarded to or intercepted by a designated gateway service (e.g., in a data path of the request). For example, the gateway service can reside on the client device (e.g., as an executable program), or can reside on a network device 432 of the cloud services 408 for instance. In some embodiments, the access gateway can correspond to or include the gateway service. The gateway service can determine if the requested network application is a sanctioned network application. The gateway service can determine if a CEB initiated the request. The gateway service can detect or otherwise determine that the request is initiated from a source (e.g., initiated by the standard browser) in the client device other than a CEB. In some embodiments, there is no requirement for a designated gateway service to detect or determine if the request is initiated from a CEB, for example if the requested network application is sanctioned, that user is initiating the request via a standard browser, and/or that the predefined URL and/or corresponding webpage is accessed.

In operation (2), the server can authenticate the user via the access gateway of the cloud services 408. The server can communicate with the access gateway to authenticate the user, in response to the request. For instance, the request can include an indication to the server to communicate with the access gateway to authenticate the user. In some embodiments, the server is pre-configured to communicate with the access gateway to authenticate the user, for requests to access a sanctioned network application. The server can send a request to the access gateway to authenticate the user. In response to the server's request to authenticate the user, the access gateway can provide credentials of the user to the server 430.

In operation (3), the gateway service and/or the server can direct (or redirect) all traffic to a secure browser 420 which provides a secure browsing service. This can be in response to at least one of: a determination that the requested network application is a sanctioned network application, a determination that the request is initiated from a source other than a CEB, a determination that the requested network application is sanctioned, a determination that user is initiating the request via a standard browser, and/or a determination that the predefined URL and/or corresponding webpage is accessed.

The user's URL session can be redirected to the secure browser. For example, the server, gateway service and/or the access gateway can generate and/or send a URL redirect message to the standard browser, responsive to the determination. The secure browser plug-in of the standard browser can receive the URL redirect message, and can for example send a request to access the non-sanctioned network application, to the secure browser 420. The secure browser 420 can direct the request to the server of the non-sanctioned network application. The URL redirect message can instruct the standard browser (and/or the secure browser plug-in) to direct traffic (e.g., destined for the network application) from the standard browser to the secure browser 420 hosted on a network device. This can provide clientless access and control via dynamic routing though a secure browser service. In some embodiments, a redirection of all traffic to the secure browser 420 is initiated or configured, prior to performing authentication of the user (e.g., using SSO) with the server.

In some embodiments, the gateway service can direct or request the server of the requested network application to communicate with the secure browser 420. For example, the gateway service can direct the server and/or the secure browser to establish a secured connection between the server and the secure browser, for establishing an application session for the network application.

In some embodiments, the secured browser 420 comprises a browser that is hosted on a network device 432 of the cloud services 408. The secured browser 420 can include one or more features of the secured browser 420 described above in connection with at least FIG. 4 for instance. The hosted browser can include an embedded browser of a CEB that is hosted on the network device 432 instead of on the client device. The hosted browser can include an embedded browser of a hosted virtualized version of the CEB that is hosted on the network device 432. Similar to the CEB installed on the client device, traffic is routed through the CEB hosted on the network device, which allows an administrator to have visibility of the traffic through the CEB and to remain in control for security policy control, analytics, and/or management of performance.

Figure 6:
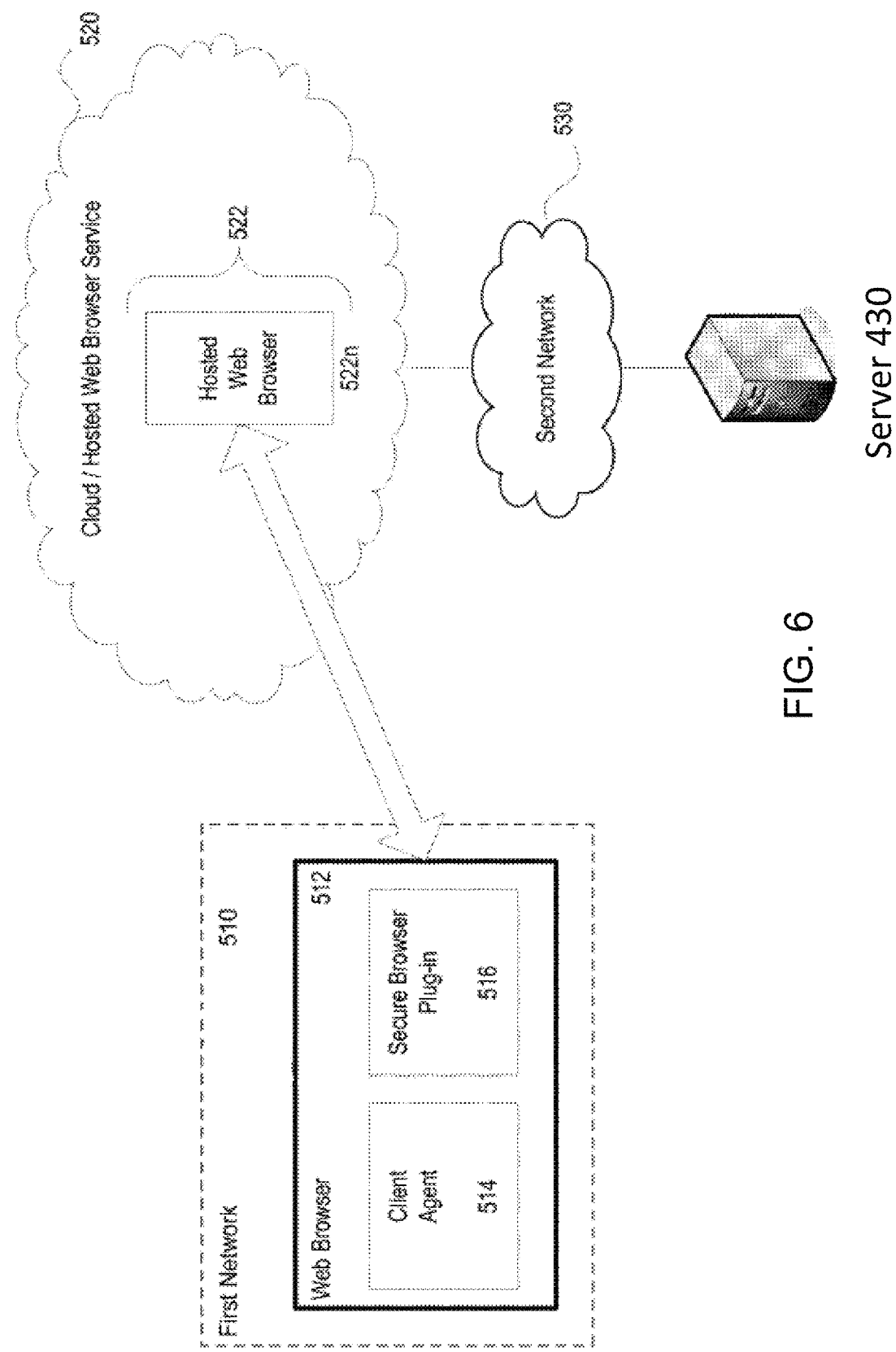

FIG. 6 illustrates an example implementation for browser redirection using a secure browser plug-in. In brief overview, the implementation includes a web browser 512 with a secure browser plug-in 516 operating on a client device, and a hosted web browser (or secure browser) 522 residing on a network device. The web browser 512 can correspond to a standard browser, instead of an embedded browser as discussed above in connection with FIG. 4 for example. The secure browser plug-in 516 can execute within a first network 510 and access a server 430 in a second network 530. The first network 510 and the second network 530 are for illustration purposes and can be replaced with fewer or additional computer networks. A secure browser plug-in 516 can be installed on the standard browser 512. The plug-in can include one or more components. One such component can include an ActiveX control or Java control or any other type and/or form of executable instructions capable of loading into and executing in the standard browser. For example, the standard browser can load and run an Active X control of the secure browser plug-in 516, in a memory space or context of the standard browser. In some embodiments, the secure browser plug-in can be installed as an extension on the standard browser, and a user can choose to enable or disable the plugin or extension. The secure browser plug-in can communicate and/or operate with the secured browser 420 for securing, using and/or accessing resources within the secured portion of the digital workspace.

By using the secure browser plug-in 516 operating within the standard browser 512 network applications accessed via the standard browser 512 can be redirected to a hosted secure browser. For instance, the secure browser plug-in 516 can be implemented and/or designed to detect that a network application is being accessed via the standard browser, and can direct/redirect traffic from the client device associated with the network application, to the hosted secure browser. The hosted secure browser can direct traffic received from the network application, to the secure browser plug-in 516 and/or a client agent 514 for rendering and/or display for example. The client agent 514 can execute within the web browser 512 and/or the secure browser plug-in, and can include certain elements or features of the client application 404 discussed above in connection with at least FIG. 4 for example. For instance, the client agent 514 can include a remote session agent 416 for rendering the network application at the web browser 512. In some embodiments, the network application is rendered at the hosted secure browser, and the rendered data is conveyed or mirrored to the secure browser plug-in 516 and/or the client agent 514 for processing and/or display.

By way of an example, a user can be working remotely and can want to access a network application that is internal to a secure corporate network while the user is working on a computing device connected to an unsecure network. In this case, the user can be utilizing the standard browser 512 executing in the first network 510, in which the first network 510 can comprise an unsecure network. The server 430 that the user wants to access can be on the second network 530, in which the second network 530 comprises a secure corporate network for instance. The user might not be able to access the server 430 from the unsecure first network 510 by clicking on an internal uniform record locator (URL) for the secure website 532. That is, the user may need to utilize a different URL (e.g., an external URL) while executing the standard browser 512 from the external unsecure network 510. The external URL can be directed to or can address one or more hosted web browsers 522 configured to access server(s) 430 within the second network 530 (e.g., secure network). To maintain secure access, the secure browser plug-in 516 can redirect an internal URL to an external URL for a hosted secure browser.

The secure browser plug-in 516 can implement network detection in order to identify whether or not to redirect internal URLs to external URLs. The standard browser 512 can receive a request comprising an internal URL for a website executing within the secure network. For example, the standard browser 512 can receive the request in response to a user entering a web address (e.g., for secure website 532) in the standard browser. The secure browser plug-in 516 can redirect the user web browser application 512 from the internal URL to an external URL for a hosted web browser application. For example, the secure browser plug-in 516 can replace the internal URL with an external URL for the hosted web browser application 522 executing within the secure network 530.

The secure browser plug-in 516 can allow the client agent 514 to be connected to the hosted web browser application 522. The client agent 514 can comprise a plug-in component, such as an ActiveX control or Java control or any other type and/or form of executable instructions capable of loading into and executing in the standard browser 512. For example, the client agent 514 can comprise an ActiveX control loaded and run by a standard browser 512, such as in the memory space or context of the user web browser application 512. The client agent 514 can be pre-configured, in some examples, to present the content of the hosted web browser application 522 within the user web browser application 512.

The client agent 514 can connect to a server or the cloud/hosted web browser service 520 using a thin-client or remote-display protocol to present display output generated by the hosted web browser application 522 executing on the service 520. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

The hosted web browser application 522 can navigate to the requested network application in full-screen mode, and can render the requested network application. The client agent 514 can present the content or rendition of the network application on the web browser application 512 in a seamless and transparent manner such that it appears that the content is being displayed by the standard browser 512, e.g., based on the content being displayed in full screen mode. In other words, the user can be given the impression that the website content is displayed by the user web browser application 512 and not by the hosted web browser application 522. The client agent 514 can transmit navigation commands generated by the user web browser application 512 to the hosted web browser application 522 using the thin-client or remote-display protocol. Changes to the display output of the hosted web browser application 522, due to the navigation commands, can be reflected in the user web browser application 512 by the client agent 514, giving the impression to the user that the navigation commands were executed by the user web browser application 512.

Referring again to FIG. 5, and in operation (4), a new browser tab can open on the standard browser, to render or display the secure browser session. The new browser tab can be established or opened by the secure browser plug-in for instance. The secure browser plug-in and/or a client agent can receive data from the secure browser session, and can render the network application within the new browser tab as discussed above in connection with FIG. 6 for instance.

In operation (5), the secure browser can feed all user interaction events via the network application, back to analytics service for processing. The secure browser plug-in can monitor for and intercept any user interaction events directed to the rendition of the network application within the browser tab. Hence, a user can use a native (or standard) browser to access a network application while allowing visibility into the network application's traffic, via the inter-operation of cloud services and a secure browser (in the absence of the client application).

Figure 7:
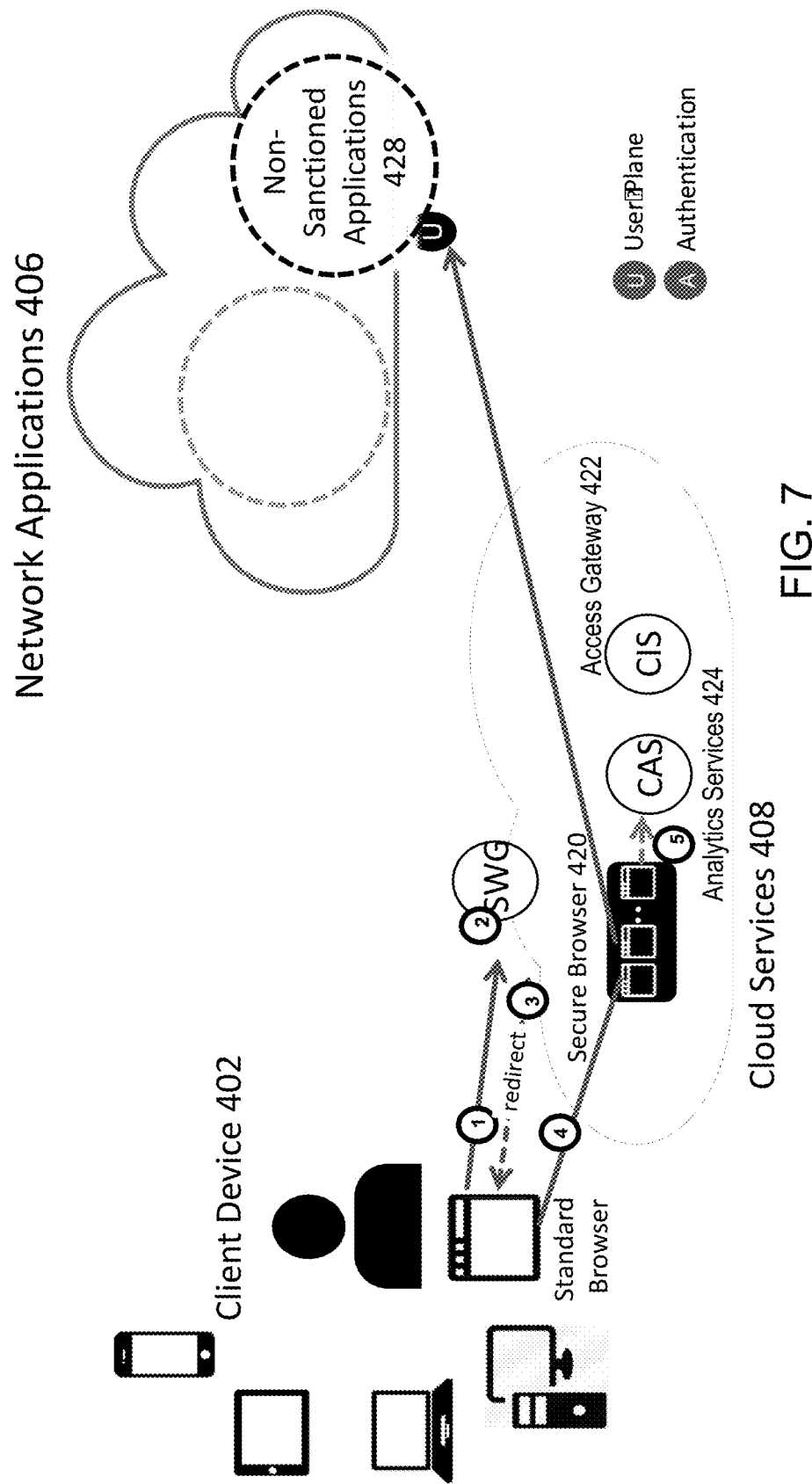
FIG. 7 is a block diagram of example embodiment of a system of using a secure browser.

FIG. 7 depicts another example embodiment of a system of using a secure browser. In brief overview, the system includes cloud services 408, network applications 406 and the client device 402. In some embodiments, various elements of the system are similar to that described above for FIG. 5. A client application with embedded browser is not available in the client device 402. A standard or typical (e.g., HTML5) browser is available on the client device, from which a user can initiate a request to access a non-sanctioned network application. A network application can be specified as being sanctioned or non-sanctioned via policies that can be set by an administrator or automatically (e.g., via artificial intelligence).

In operation (1), the user can attempt to log into a non-sanctioned network application using the standard browser. The user can attempt to access a webpage of a server that provisions the network application, and to initiate a request to access the network application. In some embodiments, the request can be forwarded to or intercepted by a designated gateway service (e.g., in a data path of the request). For example, the gateway service (sometimes referred to as SWG) can reside on the client device (e.g., as an executable program), or can reside on a network device 432 of the cloud services 408 for instance. The gateway service can detect or otherwise determine if the requested network application is a sanctioned network application. The gateway service can determine if a CEB initiated the request. The gateway service can detect or otherwise determine that the request is initiated from a source (e.g., initiated by the standard browser) in the client device other than a CEB.

In operation (2), the gateway service detects that the requested network application is a non-sanctioned network application. The gateway service can for instance extract information from the request (e.g., destination address, name of the requested network application), and compare the information against that from a database of sanctioned and/or non-sanctioned network applications. The gateway service can determine, based on the comparison, that the requested network application is a non-sanctioned network application.

In operation (3), responsive to the determination, the gateway service can block access to the requested network application, e.g., by blocking the request. The gateway service can generate and/or send a URL redirect message to the standard browser, responsive to the determination. The URL redirect message can be similar to a URL redirect message sent from the server to the standard browser in FIG. 5 in operation (3). A secure browser plug-in of the standard browser can receive the URL redirect message, and can for example send a request to access the non-sanctioned network application, to the secure browser 420. The secure browser 420 can direct the request to the server of the non-sanctioned network application.

The server of the non-sanctioned network application can authenticate the user via the access gateway of the cloud services 408, e.g., responsive to receiving the request from the secure browser. The server can communicate with the access gateway to authenticate the user, in response to the request. The server can send a request to the access gateway to authenticate the user. In response to the server's request to authenticate the user, the access gateway can provide credentials of the user to the server 430. Upon authentication, the secure browser (or a corresponding CEB) can establish a secured connection and an application session with the server.

In operation (4), a new browser tab can open on the standard browser, to render or display the secure browser's application session. The new browser tab can be established or opened by the secure browser plug-in for instance. The secure browser plug-in and/or a client agent can receive data from the secure browser session, and can render the network application within the new browser tab as discussed above in connection with FIGS. 5-6 for instance.

In operation (5), the secure browser can feed all user interaction events via the network application, back to analytics service for processing. The secure browser plug-in can monitor for and intercept any user interaction events directed to the rendition of the network application within the browser tab. Hence, a user can use a native (or standard) browser to access a network application while allowing visibility into the network application's traffic, via the interoperation of cloud services and a secure browser (in the absence of the client application).

In some embodiments, in the absence or non-availability of a CEB on the client device, browser redirection is performed so that each requested network application is accessed via a corresponding hosted secure browser (or hosted CEB) for handling, instead of having all traffic redirected through a single hosted secure browser (or hosted CEB). Each dedicated secure browser can provide compartmentalization and improved security.

The use of a CEB, whether hosted or local to the client device, can allow for end-to-end visibility of application traffic for analytics, service level agreement (SLA), resource utilization, audit, and so on. In addition to such visibility, the CEB can be configured with policies for managing and controlling any of these as well as other aspects. For example, DLP features can be supported, to control "copy and paste" activities, download of files, sharing of files, and to implement watermarking for instance. As another example, the CEB can be configured with policies for managing and controlling access to local drives and/or device resources such as peripherals.

Figure 8:
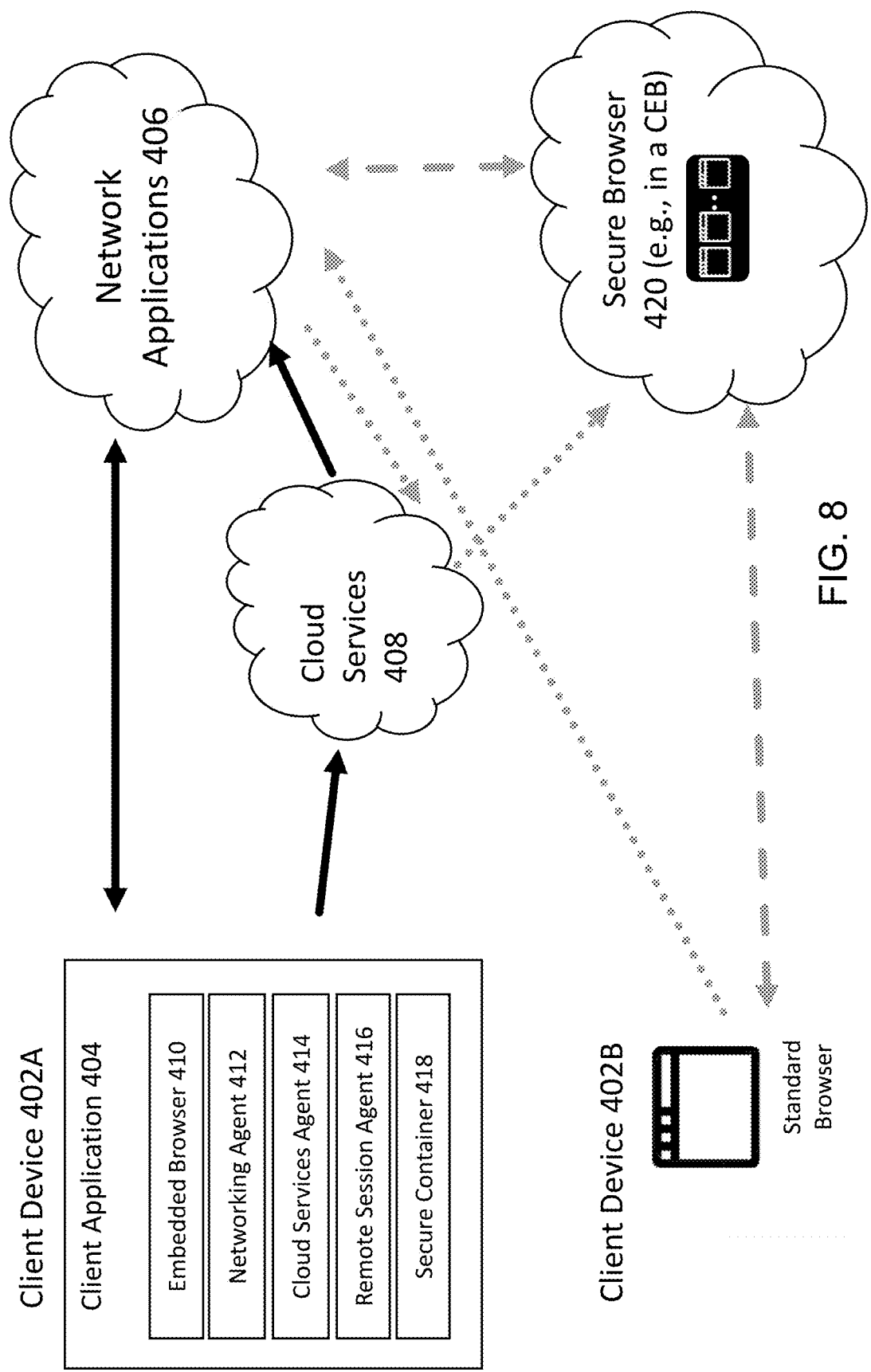
FIG. 8 is a block diagram of an example embodiment of a system for using local embedded browser(s) and hosted secured browser(s)

Referring now to FIG. 8, an example embodiment of a system for using local embedded browser(s) and hosted secured browser(s) is depicted. An environment is shown where different types of client devices 402A, 402B can be used (e.g., in a BYOD context), such that one can be locally equipped with a suitable CEB, and another client device may not have a suitable local CEB installed. In such an environment, systems described in FIGS. 4, 5 and 7 can be used to support each of the client devices based on the availability of a locally installed and suitable CEB.

Figure 9:
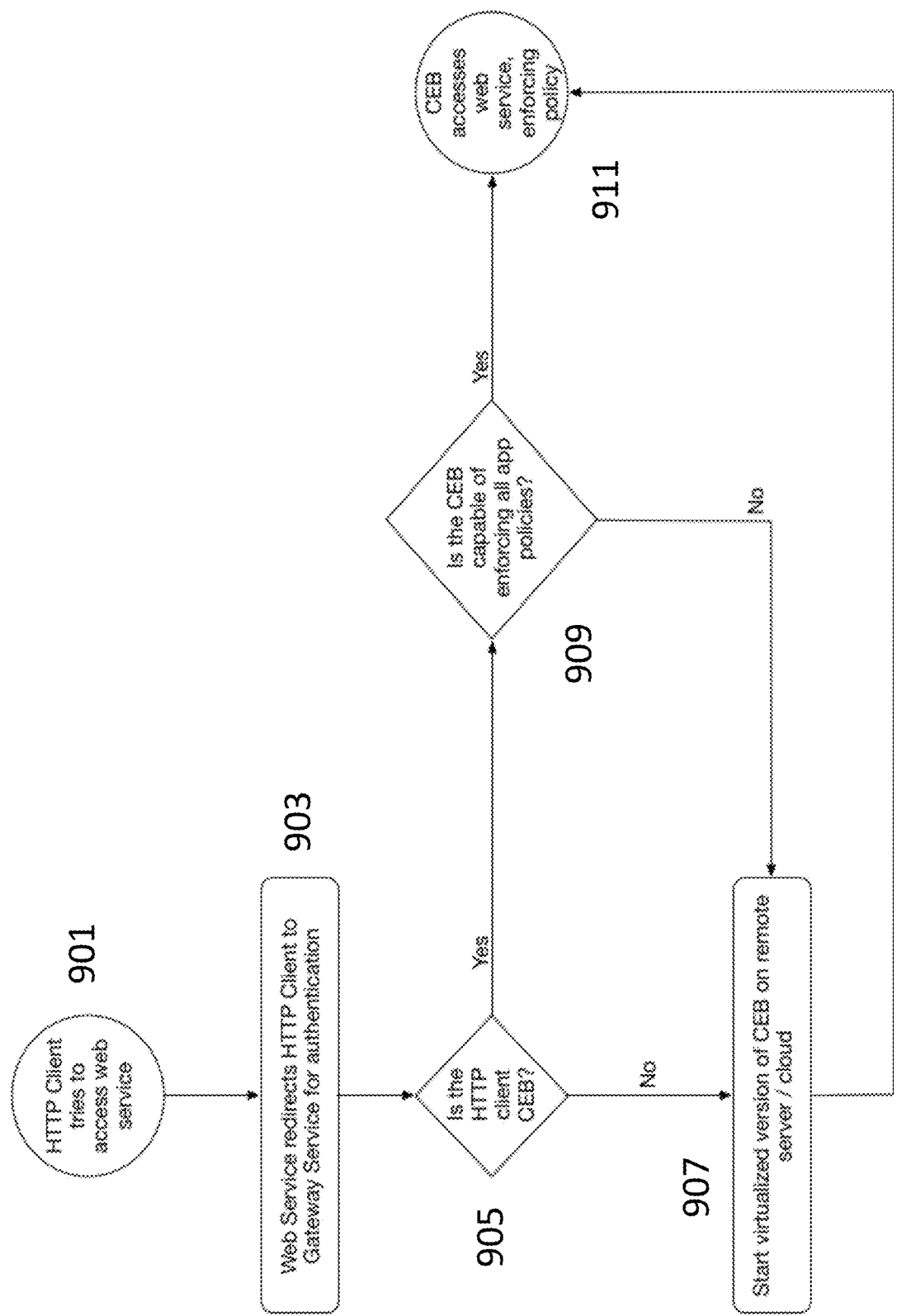
FIG. 9 is an example process flow for using local embedded browser(s) and hosted secured browser(s)

FIG. 9 depicts an example process flow for using local embedded browser(s) and hosted secured browser(s). The process flow can be used in the environment described above in FIG. 8, to determine whether an embedded browser or a hosted secured browser should be used for each client device to access a network application. For example, in operation 901, a HTTP client can attempt to access a web service (e.g., server of a network application). In operation 903, the web service can redirect the HTTP client to a gateway service for authentication. In operation 905, the gateway service can determine if the HTTP client is a CEB. If so, in operation 909, the gateway service can determine if the CEB is a suitable CEB, e.g., capable of enforcing defined application policies. If so, in operation 911, the CEB is allowed access to the web service, and can enforce the defined policies.

If the gateway service determines that the HTTP client is not a CEB, the gateway service can cause a virtualized version of a CEB to be initialized and hosted on a remote server (e.g., a network device 432 of cloud services 408), in operation 907. In some embodiments, such a hosted CEB can already be available on a network device 432, and can be selected for use. For example in operation 911, the CEB is allowed access to the web service, and can enforce the defined policies.

If the gateway service determines that the HTTP client is a CEB, but that the CEB is not a suitable CEB, the gateway service can cause a virtualized version of a CEB to be initialized and hosted on a remote server (e.g., a network device 432 of cloud services 408), in operation 907. In some embodiments, such a hosted CEB can already be available on a network device 432, and can be selected for use. For example in operation 911, the CEB is allowed access to the web service, and can enforce the defined policies.

In some embodiments, if the user is requesting access to a web application located in a company data center, the gateway service (in cloud service or on premise) can allow access when the client application with CEB is detected. Otherwise, the request can be routed to a service with the hosted virtualized version of the CEB, and then access is authenticated and granted.

At operation 905 and/or operation 909 for instance, the decisions made on whether the HTTP client is a CEB and whether it is a suitable CEB can be determined by a number of factors. For example, to determine if the HTTP client is CEB, the gateway service can take into account factors, for example including at least one of: user Identity and strength of authentication, client Location, client IP Address, how trusted the user identity, client location, client IP are, jailbreak status of the client device, status of anti-malware software, compliance to corporate policy of the client device, and/or remote attestation or other evidence of integrity of the client software.

To determine if the CEB is able to honor or support all defined application policies (which can vary by client version, client OS platform and other factors), the client device's software and gateway service can perform capability negotiation and/or exchange version information. In some embodiments, the gateway service can query or check a version number or identifier of the CEB to determine if the CEB is a suitable CEB to use.

Driving all the traffic though the CEB then allows additional control of content accessing SaaS and Web based systems. Data Loss Prevention (DLP) of SaaS and Web traffic can be applied through the CEB app with features including copy and paste control to other CEB access applications or IT managed devices. DLP can also be enforced by enabling content to be downloaded only to designated file servers or services under IT control.

Figure 10:
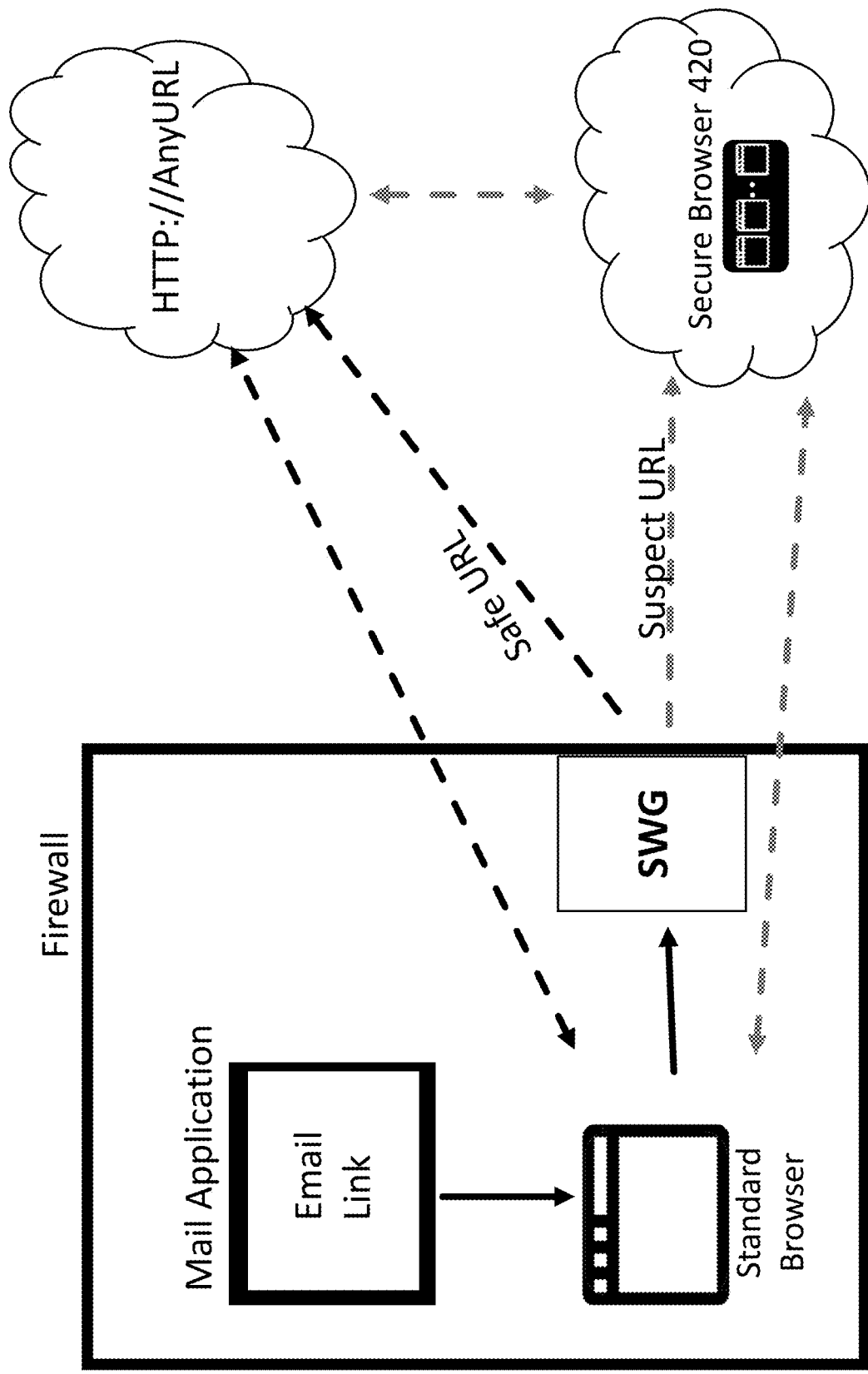
FIG. 10 is an example embodiment of a system for managing user access to webpages.

Referring now to FIG. 10, depicted is an example embodiment of a system for managing user access to webpages. Some webpages (or websites) are known to be safe while others can be suspect. A user can access a webpage via a corresponding URL through a standard browser. For example, the user can click on a link corresponding to the URL, which can be included in an email being viewed using a mail application. An access gateway (SWG) can intercept an access request generated by the clicking of the link, and can determine if the corresponding URL is safe or suspect. If the URL is known to be safe, the access gateway can allow the request to proceed to the corresponding website or web server. If the URL is suspect, the access gateway can redirect the request to be handled via a hosted secure browser. The secure browser can request access for, and access the webpage (on behalf of the standard browser), and can allow the webpage information to be conveyed to the standard browser, similar to the handling of a network application via browser redirection as discussed in connection with at least FIGS. 5 and 7.

C. Systems and Methods for Systems and Methods for Managing Sessions to Network Applications Accessed Via a Client Application Including an Embedded Browser The present disclosure is directed towards systems and methods for managing sessions to network applications accessed via a client application including an embedded browser. A client application executing on a client device can allow a user to access applications (apps) that are served from and/or hosted on one or more servers, such as web applications and SaaS applications (hereafter sometimes generally referred to as network applications). A browser that is embedded or integrated with the client application can render to the user a network application that is accessed or requested via the client application, and can enable interactivity between the user and the network application. The browser is sometimes referred to as an embedded browser, and the client application with embedded browser (CEB) is sometimes referred to as a workspace application. The client application can establish a secure connection to the one or more servers to provide an application session for the user to access the network application using the client device and the embedded browser. The embedded browser can be integrated with the client application to ensure that traffic related to the network application is routed through and/or processed in the client application, which can provide the client application with real-time visibility to the traffic (e.g., when decrypted through the client application), and user interactions and behavior. The embedded browser can provide a seamless experience to a user as the network application is requested via the user interface (shared by the client application and the embedded browser) and rendered through the embedded browser within the same user interface. By using the embedded browser, the present disclosure can apply a consistent enforcement policy across different SaaS apps accessed via the client device executing with the embedded browser. For example, SaaS apps or services can have a variety of session timeout policies, or no timeout policy. The present disclosure can set, configure, provide or otherwise apply a single policy, or a per app policy that applies to all web or SaaS apps launched from the CEB.

The client application can monitor keyboard activity during usage of each CEB session. When the time limit set by the administrator (or other entity or file) is reached, the client application can execute a command to kill the CEB app for all CEB sessions (of a single application or multiple applications). Further, the systems and methods of the present disclosure can allow a policy to keep sessions launched in the CEB to be kept alive as long as there is any activity in any of the CEB sessions. The activity monitor for each CEB session can report actual keyboard activity to the primary CEB app. Each CEB session can include a process to simulate keyboard activity. The simulated keyboard activity can include, for example, a blank space and enter then backspace or other keyboard activity that reports activity to the SaaS system but does not alter the desired user input into the CEB app or CEB session. The client application can execute the keyboard simulation in each idle CEB session when there is actual keyboard activity in any CEB session. However, when there is no actual keyboard activity in any session, the keyboard simulation will not be run. Thus, the client application can facilitate timing out all sessions according to the policy.

Figure 11:
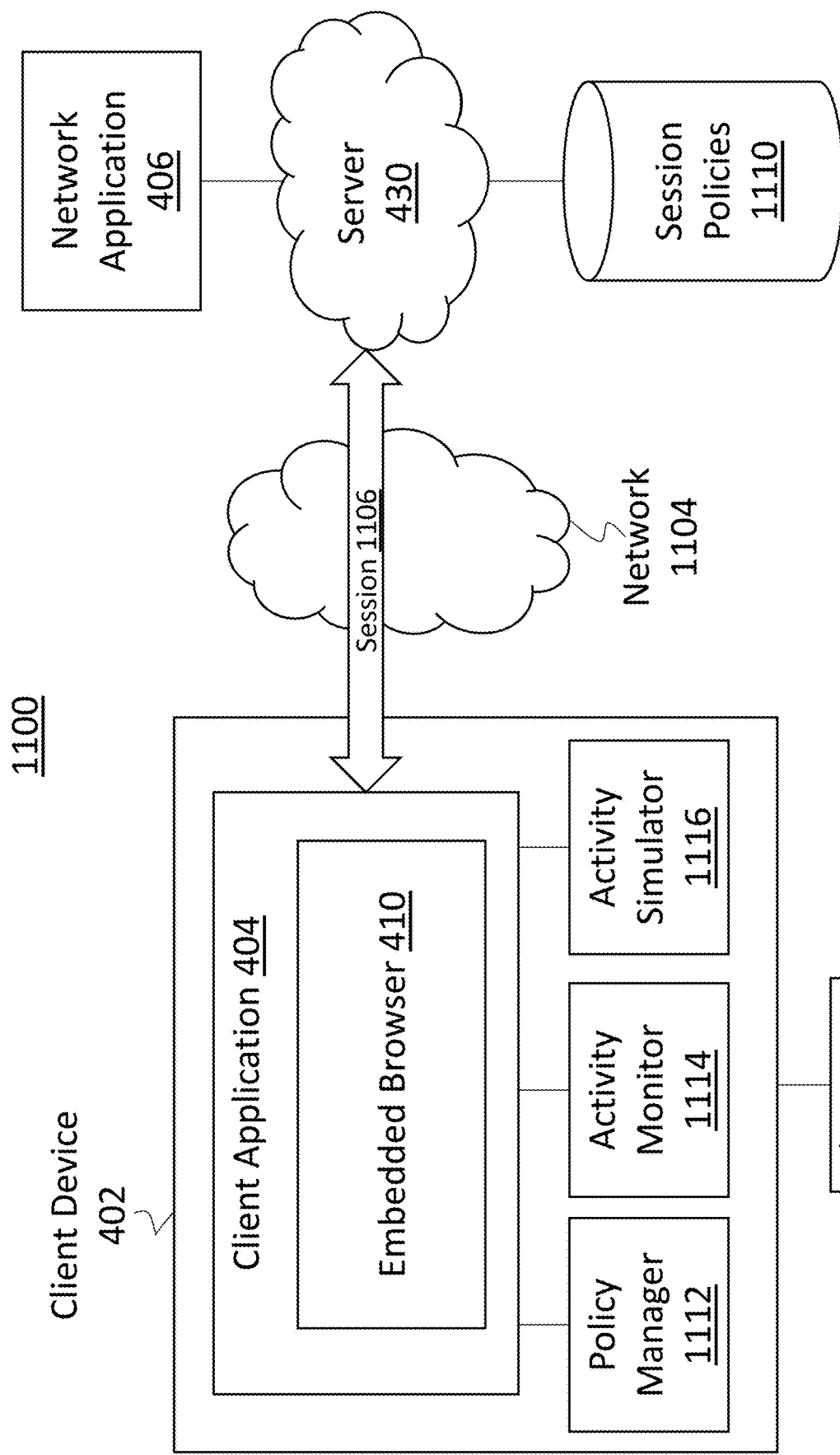
FIG. 11 is an example embodiment of a system for managing sessions to one or more network applications.

Referring to FIG. 11, depicted is a block diagram of one embodiment of a system 1100 for managing sessions to network applications. The system 1100 can include one or more servers 430 and one or more client devices 402. The system 1100 can include one or more input/output devices 1118 communicatively coupled or connected to the client device 402. The system 1100 can include a client application 404 that includes an embedded browser 410 that can render information of a network application 406 accessed via the client application 404. The client application 404 can be an instance of the client application 404 previously detailed herein. The client application 404 with the embedded browser 410 (CEB) can include any element of a CEB as previously described herein. In some embodiments, the client applications 404 can execute on a client device 402 operated by a user. In some embodiments, the client device 402 can include one or more policy managers 1112. In some embodiments, the client device 402 can include one or more activity monitors 1114. In some embodiments, the client device 402 can include one or more activity simulators 1116. In some embodiments, the client application 404 can establish or execute the one or more policy managers 1112. In some embodiments, the client application 404 can establish or execute the one or more activity monitors 1114. In some embodiments, the client application 404 can establish or execute the one or more activity simulators 1116.

The network application 406 can be an instance of the network application 406 previously detailed herein. The network application can include any type or form of network application 406 previously detailed herein. The one or more client devices 402 can communicate, interface with, or otherwise interact with the one or more servers via a network 1104. The network 1104 can include one or more component or functionality of the transport network 262 depicted in FIG. 2 or the public internet 284 depicted in FIG. 2, or some other network or Internet communication channel.

Each of the above-mentioned elements or entities is implemented in hardware, or a combination of hardware and software, in one or more embodiments. Each component of the system 1100 can be implemented using hardware or a combination of hardware or software detailed above in connection with FIG. 1. For instance, each of these elements or entities can include any application, program, library, script, task, service, process or any type and form of executable instructions executing on hardware of a client device (e.g., the client applications 404). The hardware includes circuitry such as one or more processors in one or more embodiments.

Still referring to FIG. 11, and in further detail, the system 1100 can include a client application 404. The client application 404 can be designed, constructed or operational to establish a session 1106 to a network application. The client application 404 can establish one or more sessions 1106 to one or more network applications 406. For example, the client application 404 can establish a single session 1106 to a single network application 406. The client application 404 can establish multiple sessions 1106 to a single network application 406. The client application 404 can establish a single separate session 1106 to multiple respective network applications 406. The client application 404 can establish multiple sessions 1106 to each of multiple network applications 406.

The client application 404 can establish the sessions 1106 to the one or more network applications 406 via an embedded browser 410 of the client application 404 or client device 402. The client application 404 can establish multiple sessions 1106 to the one or more network application 406 by using one or more session establishment techniques, procedures, protocols, or processes described in FIG. 4. For example, the client application 404 can include a networking agent 412 that establishes or facilitates establishment of a network connection between the client application 404 and one or more resources (e.g., server 430 serving a network application 406). The client application 404 can perform handshaking for a requested connection from the client application 404 to access a network application 406, and can establish the requested connection (e.g., secure or encrypted connection). The client application 404 can connect to enterprise resources (including services) for instance via a virtual private network (VPN) or secure socket layer (SSL) VPN between the client application 404 and the server 430 providing the network application 406. The client application can include a remote session agent 416, for example as depicted in FIG. 4, to support display a remoting protocol (e.g., HDX or ICA), or establish a remote desktop session and/or remote application session for any variety of protocols, such as the Remote Desktop Protocol (RDP), Appliance Link Protocol (ALP), Remote Frame Buffer (RFB) Protocol, and ICA Protocol. For example, the client application 404 (e.g., via remote session agent 416) can establish a remote application session for a user of the client device to access an enterprise network application. Thus, the client application 404 can establish the remote application session (e.g., session with the network application 406) within or over a secure connection (e.g., a VPN) established by the networking agent 412 for instance.

In some embodiments, the system 1100 can include one or more policy managers 1112. In some embodiments, the client application 404 can include or execute a policy manager 1112, or otherwise provide one or more component or functionality of the policy manager 1112. The policy manager 1112 can be designed, constructed or operational to identify a session timeout policy for managing a session of the client application. The client application 404 (e.g., via policy manager 1112) can identify the session timeout policy specifying a time period (e.g., 1 minute, 2 minute, 3 minutes, 5 minutes, 10 minutes, 20 minutes, 30 minutes, 1 hour, 2 hour, 3 hours, 6 hours, 12 hours, etc.) for which a session is determined to be inactive. In some embodiments, the policy manager 1112 can input one or more values or parameters into the session timeout policy in order to compute or otherwise determine the time period for which a session is determined to be inactive. In some embodiments, the embedded browser can be configured to use the same session policy or default session policy for all sessions established via the embedded browser. In some embodiments, the session timeout policy can be configured for a type of session, type of network application 406, type of client device 402, user profile information, organization profile information, or other environmental factors such as geographic location, time of day, month, season, etc.

The client application 404 may receive or identify the session timeout policy responsive to or at the time of establishing the session to the network application 406. In some embodiments, to identify or determine the session timeout policy or the time period, the client application 404 can query a session policies data repository 1110. The session policies data repository 1110 can be managed or maintained by the server 430. The session timeout policies depository 1110 can be maintained or managed by the same server that provides the network application 406. In some cases, the session policies data repository 1110 can be maintained or managed by a server 430 that is different from the server 430 that provides the network application 406.

The session policies data repository 1110 can include one or more policies for the one or more network applications 406 provided via the one or more servers 430. The policy can be configured or established by a provider of the network application 406. The policy can be configured or established by an administrator of the network application 406, server 430, or client device 402. For example, an application developer that developed network application 406 can establish a session policy for the network application 406. In another example, an administrator of the server 430 that runs, executes or otherwise provides the network application 430 can configure or establish the session policy. In yet another example, an administrator or user of the client device 402 can configure or establish a session policy for the network application 406.

In some embodiments, multiple session policies may be established or provided for a single network application 406. The multiple session policies may be consistent or inconsistent with one another. In some embodiments, the session policy can be provided to the client application 404 (or policy manager 1112) responsive to initiating, launching, or accessing the network application 406 via the embedded browser 410. For example, the session policies data repository 1110 can transmit or provide the policy to use for a particular network application 406 or particular session for the network application 406 responsive to the client application 404 establishing the session to the network application 406 via the embedded browser 410. In some cases, the client application 404 can transmit a request or query to the session policies data repository 1110 for the session timeout policy during or responsive to establishment of the session 1106 to the network application 406 via the embedded browser 410. For example, during establishment of the session 1106 to the network application 406, the client application can obtain, retrieve or otherwise identify one or more parameters or policies associated with the network application 406 to be used to manage or maintain the session 1106 to the network application 406. The client application 406 can obtain the parameters or policies for each of the sessions to the one or more network applications 406.

In some embodiments, the policy manager 1112 can transmit a request or query the session policies data repository 1110 for a session timeout policy based on an identifier or other parameter or value associated with the session. For example, the policy manager 1112 can query the session policies data repository 1110 to obtain a first session timeout policy for a first network application 406. The policy manager 1112 can query the session policies data repository 1110 via network 1104. The policy manager 1112 can query the session policies data repository 1110 via server 430. The policy manager 1112 can provide one or more identifiers to use to perform the query. The identifier can be an identifier associated with the client device 402, such as a device identifier, username, user identifier, account identifier, or login identifier. The identifier can be associated with the client application 404 or embedded browser 410 used to access the network application 406, such as a version of the client application 404 or embedded browser 406, provider of the client application 404, or other identifier or indicator of the type or version of the client application 404 or embedded browser 410. The identifier can be associated with the network application 406, such as a name of the network application 406, type of network application 406, or version of the network application 406. Thus, the policy manager 1112 can construct or generate a request or query to transmit to server 430 to determine or identify a session timeout policy to use.

The policy manager 1112 can transmit a request or query to the session policies data repository 1110 or server 430 for the session timeout policy. The policy manager 1112 can cause the session policies data repository 1110 to perform a lookup in the data repository using the one or more identifiers or other information provided in the request or query in order to identify or retrieve the corresponding session timeout policy for the first network application 406. The session policies data repository 1110 can provide, responsive to the lookup, one or more session timeout policies. The one or more session timeout policies can correspond to or be responsive to the one or more identifiers or other information provided in the query.

The session policy can vary based on the network application 406 being accessed or parameters or factors associated with the client device 402 or the session. The session policies can be based on profile information associated with a client device 402, account associated with the client device 402, profile associated with the network application 406, historical session information or historical session timeout policies used by the client device 402, account associated with the client device 402, or network application 406. Factors associated with the client device 402 can include type of client device (e.g., desktop computer, laptop computer, tablet computing device, mobile computing device, smartphone, etc.), public client device 402 versus private client device 402, operating system of the client device 402, antivirus software running on the client device 402, type of network interface being used by the client device 402 (e.g., wired Ethernet, wireless internet, public internet, private intranet, etc.), geographic location of the client device 402 (e.g., state, country, city, work location, home location or traveling location). Factors associated with the session can include, for example, time of day of the session, date of the session, number of other concurrent or overlapping sessions, authentication level of the session. Factors associated with the network application 406 being accessed can include, for example, nature or type of the network application 406 (e.g., a financial application, multimedia player application, gaming application, security application, etc.).

The session policies can specify values, conditions, parameters, activities, triggers, commands or actions that can be used by the client application 404 or embedded browser 410 to manage a session 1106 to a network application 406. Example values, conditions or parameters of session timeout policies can include time period or duration of the session, time period or duration of inactivity, network bandwidth usage, processor usage, memory usage, input/output device usage, geofence around client device 402, number of concurrent or overlapping sessions, number of errors or faults detected in a session, number of packet drops associated with a session, etc. Example commands or actions specified in or by a session timeout policy can include terminate the session, resume the session, disconnect the session, disable the session, disable or limit certain functionality of the session (e.g., input, type of input, output, type of output, limit memory usage, limit or throttle processor usage, limit or throttle network bandwidth usage), request re-entry of authentication or login credentials for the session, or generate a prompt. For example, the session policy can be a session timeout policy that specifies a time period for which a session is determined to be inactive, and command to terminate the session responsive to detection of session inactivity for the time period. Thus, the session timeout policy can cause the client application 404 to terminate the session responsive to detecting inactivity for the specified time period. If the client application 404 detects that a session has been inactive for an amount of time that is greater than or equal to the specified time of the session timeout policy identified for the session 1106, then the session policy can cause the client application 404 to terminate the one or more sessions.

In another example, a session policy can include a geofence, and an action can include termination of the session or a prompt that requests affirmation to continue the session responsive to triggering of the geofence. A geofence can refer to a geographic boundary or radius around a specific location, such as a current location or other predetermined location. The policy can be triggered responsive to the client device 402 crossing the geofence.

In another example, a session policy can include memory utilization of the session, and an action to limit or prevent further memory usage. For example, the session policy can set a maximum allocated memory for the session, and if the session exceeds the memory amount, the policy can cause the client application 404 to block further memory usage, generate a prompt to request authorization for further memory usage, or terminate the session.

In another example, a session policy can specify an activity that triggers an action. The activity can be an activity in the session, such as a type of input or request. The type of input can be a malicious or fraudulent input or activity. The activity can be detected based on a code word, keyword or other term. The activity can be detected based on a series of inputs or multiple or excessive requests or inputs. The action can include terminating the session. The action can include locking an account, the client application 404, or the embedded browser 410 to prevent further access to the network application 406 for a predetermined time period or until an administrator unlocks the client device 402, client application 404 or embedded browser 410.

The system 1100 can include an activity monitor 1114 designed, constructed or operational to monitoring activity in the embedded browser for each of the plurality of sessions. The activity monitor 1114 can monitor the session for an activity, a value, a parameter, or other condition specified in the session policy identified for the session by the policy manager 1112. The activity monitor 1114 can be executed or initiated by the client application 404, embedded browser 410, or policy manager 1112. For example, the client application 404 can initiate, launch or execute the activity monitor 1114 responsive to establishing the session 1106 to the network application 406. In some cases, the client application 404 can execute or launch a separate activity monitor 1114 or instance of the activity monitor 1114 for each session 1106 to each network application 406. In some cases, the client application 402 can consolidate the number of instances of activity monitors 1114 if there are multiple sessions 1106 that are configured to track or monitor the same activity or parameter. In some embodiments, the client application 404 can determine to invoke or execute the activity monitor 1114 responsive to detecting that there is more than one session established in the embedded browser 410. For example, if there is only one session established in the embedded browser, the client application 404 may determine not to execute an activity monitor 1114 in order to conserve computational or power resources, but if there is more than one session established in the embedded browser 410, then the client application 404 can determine to execute an activity monitor 1114 for each of the sessions to facilitate enforcement of a consistent session timeout policy across the multiple sessions. In some embodiments, the client application 404 can execute the activity monitor 1114 even if only one session has been established in order to enforce a session timeout policy that may be different than the session timeout policy configured by an administrator of the network application 406 being accessed in the session (e.g., enforce a session timeout policy established by a user of the client device 402 that may have a different timeout value as compared to the session policy established by the administrator of the network application 406). If there are different timeout policies that may conflict with one another, the system can select the longest timeout policy to apply to all sessions, the shortest timeout policy to apply to all sessions, or the timeout policy corresponding to the session or network application having the highest priority or weight (e.g., based on security requirements or ability to access sensitive data).

The activity monitor 1114 can be communicatively coupled to one or more I/O devices 1118 or an interface of the client device 402 or client application 404 that receives input or provides output from or to the I/O devices 1118. The activity monitor 114 can access, monitor or track the activity associated with the session 1106 based on activity associated with the I/O devices 1118. The activity monitor 1114 can track or monitor activity of the session based on data packets transmitted or received during the session. For example, the activity monitor 1114 can include a hooking component configured to intercept or otherwise track or monitor data packets received or sent during the session 1106 over network 1104. The activity monitor 1114 can be a part of the embedded browser 410 or client application 404, or otherwise integrated or interfaced with the client application 404 or embedded browser 410.

The activity monitor 1114 can monitor specific types of activity as specified by the session policy for the session 1106, while ignoring or not monitoring or tracking other activity. In some embodiments, the activity monitor 114 can monitor for a type of activity without parsing or otherwise processing aspects or information of the session. For example, the activity monitor 1114 can track or monitor an activity level of the session 1106. Activity level can be based on input activity into the session 1106, or output activity from the session 1106. The activity level can be binary, such as inactive (or idle) or active. Inactive or idle can refer to not detecting any keyboard input for the session 1106 for a specified time period. Inactive or idle can refer to not detecting any mouse clicks or trackpad clicks or other input into the session 1106 for the specified time period. Inactive or idle can refer to or include not receiving any voice input via a microphone for the session 1106. Inactive or idle can refer to not receiving any input for the session 1106 via an I/O device 1116 (e.g., movement detected via an accelerometer, audio input detected via a microphone, visual input detected via a camera, touch input detected via a multitouch sensor, etc.).

The activity level can include degrees of activity, such as inactive, low activity, medium activity, or high activity. The activity level can include a score or metric, such as an amount of activity per time period or rate of activity (e.g., number of keyboard or mouse inputs per second or other time interval). Activity level can be based on output from the session 1106 (e.g., output of network application 1106 accessed via the embedded browser 410). Output activity level can be based on amount of data packets output during the session, screen motion, variation or change in pixels being rendered in the embedded browser 410 for the session, processor or memory utilization for the session 1106, etc.

Thus, the client application 404 or client device 402 can establish one or more activity monitors 1114 for monitoring each session 1106 of the multiple sessions 1106 used to access the one or more network applications 406. The one or more activity monitors 1114 can monitor activity associated with the session 1106 pursuant to the session policy identified for the session 1106, such as keyboard activity in each session.

If the activity monitor 1114 detects that one of the sessions 1106 is inactive or idle, the client application 404 can terminate each of the sessions established by the client application 404. For example, the client application 404 can terminate each of the sessions 1106 accessed via the embedded browser 410 responsive to detecting that at least one of the sessions 1106 is inactive or idle. To do so, the client application 404 can execute a command to terminate the network application 406, session 1106, or client application 404 itself. Thus, the client application 404 can terminate all sessions responsive to detecting that one of the sessions is about to timeout due to inactivity, thereby providing a consistent session timeout policy for all sessions.

In some embodiments, the system 1100 can include an activity simulator 1116 designed, constructed or operational to simulate activity in one or more sessions 1106 that are idle if one or more of the other sessions are active. The client device 402, client application 404, or embedded browser 410 can initiate, launch, execute or otherwise establish an activity simulator 1116 for a session 1106. The client application 404 can execute the activity simulator 1116 for the idle or inactive sessions responsive to detecting activity in one of the other sessions. The client application 404 can execute the activity simulator 1116 for each idle session if the one or more activity monitors 1114 has detected that any one of the sessions has activity. For example, the client application 404 can establish three sessions to one or more network applications as follows: a first session, a second session, and a third session. The activity monitor 1114 can detect activity in the first session, but may detect that the second session and the third session are both idle or inactive based on not receiving any keyboard input for the second and third sessions. Responsive to determining that the first session is active, but the second and third sessions are inactive or idle, the client application 404 can execute an activity simulator 1116 for the second session and execute an activity simulator 1116 for the third session. Further, the client application 404 can determine to not execute an activity simulator 1116 for the first session because the client application 404 determined that the first session is active or not idle.

In some embodiments, however, the client application 404 can determine to not execute an activity simulator 1116 if the client application 404 (e.g., via activity monitor 1114) determines that all of the sessions established by the client application 404 are inactive or idle. For example, if the client application 404 had established a total of three sessions, and determined that all three sessions were idle, then the client application 404 can determine to forego or not execute the activity simulator 1116, thus reducing processor and memory utilization on the client device 402 by not simulating activity of each of the idle sessions. Thus, the client application 404 can determine to not execute the one or more activity simulators 1116 responsive to the one or more activity monitors 1114 detecting that all of the sessions are idle.

In some embodiments, the client application 404 can determine to execute an activity simulator 1116 to simulate activity in one or more sessions responsive to the one more activity monitors 1114 detecting that the one or more sessions are idle and that the time period of the session timeout policy has not been reached for any of the sessions. The activity simulator 1116 can simulate activity to cause the client application 404 or embedded browser 410 to report activity to the SaaS system, but does not alter the desired user input, thereby preventing the SaaS system (e.g., server 430 or network application 406) from terminating the session. The simulation can be in each idle CEB session when there is actual activity in any CEB session. When there is no actual activity in any session, the simulation may not be run. Thus, the activity simulator 1116 allows for all sessions 1106 established via the embedded browser 410 to time out according to a single session policy.

For example, the client application 404 can establish a first session, a second session, and a third session. The client application 404 (e.g., via activity monitor 1114) can determine that the first session is idle based on not detecting any keyboard activity for the specified time period of the session policy for the first session. However, the activity monitor 1114 can determine that the specified time period for the second and third sessions has not yet been reached. The activity monitor 1114 may or may not have detected any activity in the second and third sessions, but since the specified time period for the second and third session (which may be the same or different specified time period) has not been reached, the client application 404 can determine to execute the activity simulator 1114 for the second and third sessions. Thus, and in some embodiments, because the respective specified time period for the second and third sessions has not yet been reached, the client application 404 can execute a respective activity simulator 1116 for each of the second and third sessions even though the activity monitor 1114 may not have detected activity in the second and third sessions.

The activity simulator 1116 can simulate activity in a session 1106 for which the client application 404 executes the activity simulator 1116. The activity simulator 1116 can, in some embodiments, simulate activity in the session in order to prevent the session from being terminated due to a timeout. For example, if a first session is active and a second session is idle, then the activity simulator 1116 can be executed for the second session in order to simulate activity in the second session, thereby preventing the second session from being terminated or otherwise timing out or triggering an action specified by the session policy for the session.

The activity simulator 1116 can be configured to simulate activity in the idle session. The activity can be selected to prevent the termination of the session pursuant triggering of the session policy. The activity simulator 1116 can parse the session policy or otherwise determine the activity based on the session policy or an instruction or command from the client application 404. For example, if the session policy of the session 1106 monitors keyboard activity for the session 1106 to determine whether the session 1106 is idle or active, then the activity simulator 1116 can simulate a keyboard activity to cause the session 1106 to still be active, thereby preventing termination of the session. For example, the server 430 or network application 406 executed by the server 430 can keep track of the session 1106 to determine whether to terminate the session based on the session being idle. Thus, to prevent the server 430 or network application 406 from terminating the session 1106, the activity monitor 1114 executing on the client device 402 or by the client application 404 can determine whether the session idle and whether to simulate activity in the session, and then execute the activity simulator 1116 for the session 1106 to simulate activity in the session, thereby causing the server 430 or network application 406 to detect activity and determine not to terminate the session 1106 to the network application 406 via the embedded browser 410.

The activity simulator 1116 can simulate activity that does not impact the content of the network application 406. For example, simulated activity can include one or more keyboard inputs such as a blank space and then a backspace, thereby nullifying or cancelling out the previous keyboard activity. Other types of non-intrusive activity that may not impact the desired input can include a mouse over on a portion of the rendering of the network application 406 in the embedded browser 410, a pointer click on a portion of the rendering, inputting the escape button or other keyboard input that is known to not cause or trigger an undesired event or change in the network application 406.

The activity simulator 1116 can include a virtual controller, automator, or other program to simulate keypresses. The activity simulator 1116 can be configured to simulate the activity in the session 1106 the activity monitor 1114 determines to be idle, but not in the session 1106 the activity monitor 1114 determines to be active. The activity simulator 1116 can include or execute a script, program or function to simulate the keyboard activity. The activity simulator 1116 can include a macro that simulates the keyboard activity, such as one or more instructions that are configured to perform the desired simulation. The activity simulator 1116 can simulate keystrokes to the target session 1106. The target session 1106 (or target network application 406) may then believe that the user has manually typed in the keystrokes using the keyboard, while the keystrokes may actually be fed into the keyboard buffer for the session 1106 by the activity simulator 1116. The macro configured to feed the keystrokes can include, for example, characters to simulate and tags that indicate a pause or duration to allow the target network application 406 to complete or process the keypress. For example, the macro can include keypress character "blank space", followed by a pause for 500 milliseconds, followed by the keypress character "delete."

In some embodiments, the session policy may be configured to timeout a first session responsive to the client device 402 being in the same geographical location for the specified time, whereas a second session times out based on keyboard activity. The client application 404 can detect keyboard activity for the second session, but may detect that the client device 402 has not moved for the specified time period, which would cause the network application 406 accessed by the embedded browser 410 in the first session to timeout. However, the activity monitor 1114, upon detecting that the session policy for the first session is going to be triggered, can execute the activity simulator 1116 to simulate motion or movement of the client device 402, which can be reported to the SaaS system (e.g., server 430 or network application 406), thereby preventing the SaaS system from terminating the first session and maintaining a consistent session timeout policy across the multiple established sessions, even though the different sessions are configured with different types of session policies. For example, location may very important, but the location-based policy may be overridden by the time out policy based on non-use.

The client application 404 can determine whether to execute an activity simulator 1116 to keep idle sessions from being terminated, or to not use the activity simulator 1116, thereby causing an idle session to terminate an active session or a session that has not yet reached a specified timeout period. For example, the client application 404 can determine not to execute an activity simulator 1116 for a session if the activity simulator 1116 has previously been executed a predetermined number of times (e.g., 1, 2, 3, 4, 5, 10, 15, etc.) for the same session within a predetermined time period (e.g., 10 minutes, 15 minutes, 20 minutes, 30 minutes, 1 hour, 2 hours, 3 hours, 6 hours, 12 hours, 24 hours, etc.) to keep the session active.

In another example, the client application 404 can determine whether or not to execute an activity simulator 1116 based on a setting established by an administrator of the client device 402, client application 404, server 430, or network application 406. The client application 404 can determine whether or not to execute an activity simulator 1116 based on a type of client device 402 (e.g., execute activity simulators 1116 for desktop computers or laptop computers, but do not execute activity simulators 1116 for smartphones), type of operating system, power source (e.g., execute the activity simulator 1116 if the client device 402 is connected to a power outlet, but do not execute the activity simulator 1116 if the client device 402 is using a battery and not connected to the power outlet), or based on devices connected to the client application 404 (e.g., keep session active if the client device 402 is connected to an external display or is in a presentation mode). In some embodiment, the client application 404 can determine whether to execute an activity simulator 1116 based on a profile established for the user of the client device 402. In some embodiment, the client application 404 can determine whether to execute an activity simulator 1116 based on historical activity associated with the user (e.g., based on log data, if the user typically re-establishes a first session responsive to a second sessions going idle and causing termination of both the first and second sessions, then the client application 404 can automatically determine to execute the activity simulator 1116 responsive to detecting that the use has established the first and second sessions and responsive to detecting that the second session is idle and is about to be terminated, thereby automatically determining to prevent termination of the second session and also automatically preventing termination of both the first and second sessions).

In some embodiments, the activity simulator 1116 can be executed to override a session timeout policy. For example, the embedded browser may establish a single session to a network application without establishing any other sessions. The session timeout policy established by an administrator of the network application can specify a first timeout value that is less than a second timeout value specified by a profile associated with an account of the user of the client device 402. The user of the client device may prefer to use the second timeout value that is greater than the first timeout value. Thus, the client application can execute an activity monitor 1114 to determine when the session is idle, and then execute an activity simulator 1116 to simulate activity that gets reported back to the network application 406, thereby preventing the network application 406 or server 430 from terminating the session responsive to the session being idle for the first timeout value, thus overriding the timeout value specified by the administrator of the network application 406. The activity monitor 1114 can determine, responsive to detecting inactivity or idleness for the second timeout value provided by the user, not to invoke or execute the activity simulator 1116. Responsive to detecting the second timeout value, the client application 404 can execute a command to terminate the session or client application. Further, if the user-specified timeout value is less than the administrator specified timeout value, the client application can execute a command to terminate the session or client application prior to when the network application 406 would have terminated the session.

Figure 12:
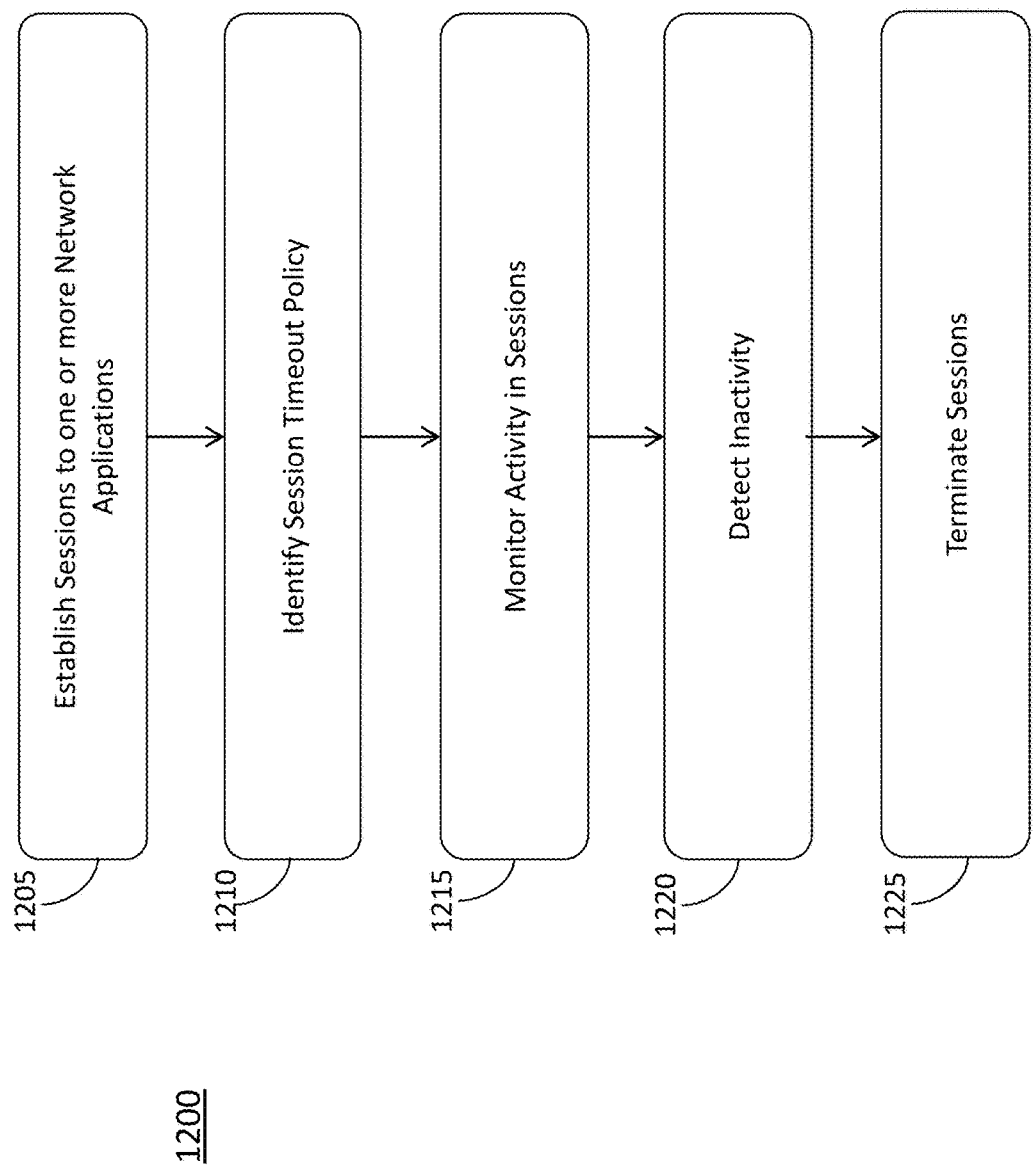
FIG. 12 is an example embodiment of a method for managing sessions to one or more network applications.

Referring to FIG. 12, depicted is a flow diagram of one embodiment of a method managing sessions to one or more network applications accessed via an embedded browser. The functionalities of the method 1200 can be implemented using, or performed by, the components detailed herein in connection with FIGS. 1-11. In brief overview, a client application can establish a session to a network application at 1205. At 1210, the client application can identify a session timeout policy. At 1215, the client application can monitor activity in the sessions. At 1220, the client application can detect inactivity in at least one of the sessions. At 1225, the client application can terminate the sessions.

Still referring to FIG. 12, and in further detail, the client application can establish a session to a network application at 1205. The client application can establish multiple sessions to one or more network applications. The network applications can be hosted on a server. The client application can include, integrate with or otherwise interface or communicate with an embedded browser or CEB to establish the session to the one or more network applications. The client application can establish the multiple sessions simultaneously or serially. The client application, in some examples, can receive an instruction to establish a predetermined subset of sessions to a predetermined one or more network applications such that the sessions are concurrent or overlapping. The client application can receive an instruction to establish a first session, and then subsequently receive an instruction or command to establish a second one or more sessions. The client application can receive the instruction or indication to establish the session from a user of the client device. In some embodiments, a first session can provide an instruction or command to execute the second one or more sessions to one or more network applications.

At 1210, the client application can identify a session timeout policy. The client application can identify a session timeout policy for managing the sessions of or established by the client application. The session timeout policy can specify a time period for which a session is determined to be inactive. The client application can identify the session policy or session timeout policy while establishing the session, such as during a handshaking process or other communication used to establish the session. In some embodiments, the client application can transmit a request or query to cloud server hosting the network application in order to determine the session policy. In some embodiments, the client application can be preconfigured with a configuration file or data file that includes an index of session policies. In some embodiments, the embedded browser can be configured to use the same session policy or default session policy for all session established via the embedded browser.

At 1215, the client application can monitor activity in the sessions. The client application can monitor activity in the embedded browser for each of the session established by the embedded browser. In some embodiments, the client application can determine to monitor activity responsive to detecting that there are multiple sessions established via the embedded browser. The client application can establish one or more activity monitors for monitoring each session of the plurality of sessions. The client application can configure the activity monitors to detect or monitor for the type of activity that would trigger the session timeout policy, such as keyboard activity, movement, visual display, pixel changes, audio input or output, etc. The activity monitor can be executed for each of the session established by the embedded browser.

At 1220, the client application can detect inactivity in at least one of the sessions. The client applications can detect, responsive to the monitoring, that inactivity of one of the sessions has reached the time period of the session timeout policy. For example, if the activity monitor has not detected any keyboard activity for the session for the specified time period, then the activity monitor can determine that the session is inactive or idle.

At 1225, the client application can terminate the sessions. The client application can terminate the sessions to the one or more network applications established via the embedded browser. The client application can terminate the sessions responsive to the detection of idleness in a session. To terminate the session, the client application can execute or provide a termination command. The client application can transmit the termination command to the network application. The client application can terminate or exit the client application itself, thereby terminating or ending all of the sessions.

In some embodiments, the client application can establish an activity simulator to simulate activity in one or more of the idle sessions. The client application can determine to establish an activity simulator to simulate activity in each of the idle sessions to prevent the idle sessions from terminating another session that may be active. However, if all of the sessions are idle, then the client application determine to not execute an activity simulator, thereby allowing all of the sessions to be terminated by the client application or corresponding network applications.

It should be understood that the systems described above can provide multiple ones of any or each of those components and these components can be provided on either a standalone machine or, in some embodiments, on multiple machines in a distributed system. The systems and methods described above can be implemented as a method, apparatus or article of manufacture using programming and/or engineering techniques to produce software, firmware, hardware, or any combination thereof. In addition, the systems and methods described above can be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture can be accessible from a file server providing access to the computer-readable programs via a network transmission line, wireless transmission media, signals propagating through space, radio waves, infrared signals, etc. The article of manufacture can be a flash memory card or a magnetic tape. The article of manufacture includes hardware logic as well as software or programmable code embedded in a computer readable medium that is executed by a processor. In general, the computer-readable programs can be implemented in any programming language, such as LISP, PERL, C, C++, C #, PROLOG, or in any byte code language such as JAVA. The software programs can be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method for managing a plurality of sessions to one or more network applications accessed via a client application comprising an embedded browser, the method comprising:
    (a) establishing, by a client application executable by one or more processors of a client device, a plurality of sessions to one or more network applications, the plurality of sessions accessible via an embedded browser of the client application;
    (b) identifying, by the client application, a plurality of session timeout policies corresponding to the plurality of sessions of the client application, at least one session timeout policy specifying a time period for which a corresponding session of the plurality of sessions is determined to be inactive;
    (c) monitoring, by the client application, activity in the embedded browser for the plurality of sessions;
    (d) detecting, by the client application responsive to the monitoring, that inactivity of a first session of the plurality of sessions has reached a first time period of a first session timeout policy corresponding to the first session;
    (e) determining, by the client application, to apply the first session timeout policy of the first session to the plurality of sessions of the client application; and
    (f) terminating, by the client application responsive to the detecting the inactivity of the first session, the plurality of sessions.

2. The method of claim 1, wherein the embedded browser is integrated into the client application.

3. The method of claim 1, wherein the one or more network applications comprise an application hosted on a server accessed by the client device via a network.

4. The method of claim 1, wherein (c) further comprises establishing one or more activity monitors for monitoring each session of the plurality of sessions.

5. The method of claim 4, further comprising monitoring by the one or more activity monitors keyboard activity in each session of the plurality of sessions.

6. The method of claim 1, further comprising establishing one or more activity simulators for simulating activity in each session of the plurality of sessions.

7. The method of claim 6, further comprising executing for each idle session of the plurality of sessions the one or more activity simulators if any one of the plurality of sessions has activity.

8. The method of claim 6, further comprising not executing the one or more activity simulators for any of the plurality of sessions if all of the plurality of sessions are idle.

9. The method of claim 1, wherein (e) further comprising executing, by the client application, a command to terminate the client application.

10. A system for managing a plurality of sessions to one or more network applications accessed via a client application comprising an embedded browser, the system comprising:
a client application executable on one or more processors of a client device, the client application comprising an embedded browser and configured to:
establish a plurality of sessions to one or more network applications accessible via the embedded browser; and
identify a plurality of session timeout policies corresponding to the plurality of sessions of the client application, at least one session timeout policy specifying a time period for which a corresponding session is determined to be inactive;
one or more activity monitors configured to monitor activity in the embedded browser for the plurality of sessions and detect that inactivity of a first session of the plurality of sessions has reached a first time period of a first session timeout policy corresponding to the first session; and
wherein the client application is configured to determine to apply the first session timeout policy of the first session to the plurality of sessions, and terminate, responsive to the detection of the inactivity of the first session, the plurality of sessions.

11. The system of claim 10, wherein the embedded browser is integrated with the client application.

12. The system of claim 10, wherein the one or more network applications comprise an application hosted on a server accessed by the client device via a network.

13. The system of claim 10, wherein the one or more activity monitors are configured to monitor keyboard activity of the plurality of sessions.

14. The system of claim 10, wherein the client application is configured to execute a command to terminate one of the client application, the embedded browser or each session of the plurality of sessions.

15. A system comprising:
a client application executable on one or more processors of a client device, the client application comprising an embedded browser and configured to establish a plurality of sessions to one or more network applications accessed via the embedded browser, wherein the plurality of sessions have corresponding session timeout policies, and identify a single session timeout policy for managing all of the plurality of sessions of the client application, wherein the single session timeout policy is different from at least one of the session timeout policies;
wherein the session timeout policies specify a time period for which a corresponding session of the plurality of sessions is determined to be inactive;
one or more activity monitors configured to monitor activity in the embedded browser for each of the plurality of sessions; and
one or more activity simulators configured to simulate activity in one or more sessions of the plurality of sessions to prevent the one or more sessions from termination based on a time period of one or more session timeout policies being less than a time period of the single session timeout policy, wherein the one or more activity simulators simulates the activity responsive to the one or more activity monitors detecting that the one or more sessions are idle and that the time period of the single session timeout policy has not been reached for any of the plurality of sessions.

16. The system of claim 15, wherein the embedded browser is integrated with the client application.

17. The system of claim 15, wherein the one or more network applications comprise an application hosted on a server accessed by the client device via a network.

18. The system of claim 15, wherein the one or more activity monitors are configured to monitor keyboard activity of the plurality of sessions.

19. The system of claim 15, wherein an activity simulator of the one or more activity simulators is configured to execute for each idle session of the plurality of sessions if the one or more activity monitors has detected that any one of the plurality of sessions has activity.

20. The system of claim 15, wherein the client application is configured not to execute the one or more activity simulators responsive to the one or more activity monitors detecting that all of the plurality of sessions are idle.

* * * * *